(12) United States Patent
Uenohara

(10) Patent No.: US 7,611,005 B2
(45) Date of Patent: Nov. 3, 2009

(54) CLUTCH COVER ASSEMBLY

(75) Inventor: Norihisa Uenohara, Neyagawa (JP)

(73) Assignee: Exedy Corporation, Osaka (JP)

( * ) Notice: Subject to any disclaimer, the term of this patent is extended or adjusted under 35 U.S.C. 154(b) by 409 days.

(21) Appl. No.: 11/604,752

(22) Filed: Nov. 28, 2006

(65) Prior Publication Data
US 2007/0131510 A1   Jun. 14, 2007

(30) Foreign Application Priority Data
Dec. 9, 2005    (JP)    ............... 2005-356827

(51) Int. Cl.
*F16D 13/75* (2006.01)
*F16D 13/70* (2006.01)
(52) U.S. Cl. ............... 192/70.252; 192/109 A; 192/111.16
(58) Field of Classification Search ........... 192/70.252, 192/101, 109 A, 111.13–111.17; 188/71.9, 188/196 F
See application file for complete search history.

(56) References Cited

U.S. PATENT DOCUMENTS

| 5,409,091 | A | 4/1995 | Reik et al. | |
|---|---|---|---|---|
| 2007/0131511 | A1* | 6/2007 | Uenohara | 192/70.252 |

FOREIGN PATENT DOCUMENTS

| GB | 2264989 | 9/1993 |
|---|---|---|
| JP | 10-227317 | 8/1998 |
| JP | 2001-304290 | 10/2001 |
| JP | 3437598 | 6/2003 |
| JP | 3471834 | 9/2003 |
| JP | 3704174 | 7/2005 |

* cited by examiner

*Primary Examiner*—Rodney H Bonck
(74) *Attorney, Agent, or Firm*—Global IP Counselors, LLP

(57) ABSTRACT

It is an object of the present invention to shorten the axial dimension of the clutch cover assembly that includes a wear compensation mechanism and a low release load mechanism. A clutch cover assembly 1 includes a clutch cover 2, a pressure plate 3, a diaphragm spring 4, a first wear compensation mechanism 8, and a mechanism 30 to achieve low release load characteristic. The low release load characteristic achieving mechanism 30 is made of a support bolt 31, a holder 32, and a second adjust spring 39. The second adjust spring 39 is located on a side of the holder 32 near the friction member 53 in the axial direction.

20 Claims, 17 Drawing Sheets

CLUTCH COVER ASSEMBLY

CROSS-REFERENCE TO RELATED APPLICATIONS

This application claims priority to Japanese Patent Application No. 2005-356827 filed on Dec. 9, 2005. The entire disclosure of Japanese Patent Application No. 2005-356827 is hereby incorporated herein by reference.

BACKGROUND OF THE INVENTION

1. Field of the Invention

The present invention relates to a clutch cover assembly. More specifically, the present invention relates to a clutch cover assembly that presses a friction member of a clutch disc assembly against the flywheel of the engine and releases the friction member from the flywheel.

2. Background Information

A clutch cover assembly is generally attached to a flywheel of an engine to transmit a driving force from the engine to a transmission. The clutch cover assembly is mainly composed of a clutch cover fixed to the flywheel, a pressure plate to sandwich a friction member of a clutch disc assembly between itself and the flywheel, and a diaphragm spring to press the pressure plate toward the flywheel. The diaphragm spring has an annular elastic portion and a plurality of lever portions extending radially inward from an inner periphery of the annular elastic portion. The diaphragm spring has a function of pressing the pressure plate and a lever function of releasing the pressure toward the pressure plate.

Pressing load characteristics of the clutch cover assembly will be described. The pressing load characteristics show a use area of the diaphragm spring as a pressing load in load characteristics. For example, as shown in FIG. 6, in the pressing load characteristic 20, an effective use area (a margin of wear) of the clutch cover assembly is an area in which a certain magnitude of the pressing load is obtained (from a set line 25 of a new product to a wear line 26 where the friction member is worn to the wear limit).

Next, the release load characteristics of the clutch cover assembly will be described. The release load characteristics show a relationship between the operation amount (the stroke of lever) of a release lever and the load that is applied to the tips of the release lever (release load). For example, as shown in FIG. 9, the release load characteristic 60 has a first portion 61 that linearly increases from the lever stroke zero, and a second portion 62 that gradually decreases. When they contact they produce a peak of the load balance point 63. The first portion 61 indicates lever rigidity of the diaphragm spring, and the second portion 62 corresponds to changes from the set line toward the right side in figures in the pressing load characteristic.

Pressing load characteristics 20 increase, as shown in FIG. 6, at a constant rate as displacement magnitude of the diaphragm spring increases from zero, but they gradually decrease after the deflection amount crosses a certain point (peak point), and gradually increase after the deflection amount crosses another point. Accordingly, a peak 21 (a portion convex upward) in the effective use area is formed, and as the wear of friction member increases (the set line shifts leftward in figures), the pressing load increases. In other words, when the friction member is worn, the release load increases and it is difficult to avoid the increase in the clutch pedal pressure.

The wear compensation mechanism mainly includes a fulcrum ring located between the clutch cover and the diaphragm spring, an urging mechanism to urge the fulcrum ring away from the pressure plate, and a restriction mechanism that prevents the fulcrum ring from leaving the pressure plate in the axial direction and allows the fulcrum ring to leave the pressure plate by the wear amount when the friction facing is worn.

In view of the above, it will be apparent to those skilled in the art from this disclosure that there exists a need for an improved clutch cover assembly. This invention addresses this need in the art as well as other needs, which will become apparent to those skilled in the art from this disclosure.

SUMMARY OF THE INVENTION

It is an object of the present invention to shorten the axial dimension of the clutch cover assembly including a wear compensation mechanism and a low release load mechanism.

It is another object of the present invention to reduce the number of components in a clutch cover assembly that includes a wear compensation mechanism and a low release load mechanism.

According to a first aspect of the present invention, a clutch cover assembly is provided to press and to release a friction member of a clutch disc assembly with a cushioning function against a flywheel of an engine. The assembly has a clutch cover, a pressure plate, a diaphragm spring, a first wear compensation mechanism, and a low release load mechanism. The clutch cover is fixed to the flywheel. The pressure plate is nonrotatably fixed to the clutch cover to sandwich the friction member between the flywheel and itself. The diaphragm spring is supported by the clutch cover to urge the pressure plate toward the flywheel. The first wear compensation mechanism maintains a posture of the diaphragm spring in response to wear of the friction member. The low release load mechanism has a first elastic member and a second wear compensation mechanism. The first elastic member is supported by the clutch cover to generate a load counteracting an urging force of the diaphragm spring during a release operation such that pressing load to the pressure plate is progressively decreased as displacement magnitude of the diaphragm spring is increased by the cushioning function of the friction member. The second wear compensation mechanism maintains a posture of the first elastic member by returning the first elastic member to a posture before the wear in response to the wear of the friction member. The second wear compensation mechanism includes a support member, a support and engagement member, and a second elastic member. The support member extends from the pressure plate toward the clutch cover. The support and engagement member is threadedly engaged with the outer circumference of the support member and is given a load in an axial direction opposite the friction member from the first elastic member. The second elastic member always applies torque to the support and engagement member so that the support and engagement member will rotate to move in an axial direction opposite the friction member. The second elastic member is located on a side of the support and engagement member near the friction member in the axial direction.

In this clutch cover assembly, since the second elastic member is located on a side of the support and engagement member near the friction member in the axial direction, the second elastic member does not protrude from the clutch cover. As a result, it is possible to reduce the protrusion of the low release load mechanism from the clutch cover, thereby dramatically reducing the axial dimension of the clutch cover assembly.

A clutch cover assembly according to a second aspect of the present invention is the clutch cover assembly of the first aspect, wherein the second elastic member is located between the clutch cover and the pressure plate in the axial direction.

In this clutch cover assembly, since the second elastic member is located between the clutch cover and the pressure plate in the axial direction, the second elastic member does not protrude out of the clutch cover. As a result, it is possible to reduce the protrusion of the low release load mechanism from the clutch cover, thereby further reducing the axial dimension of the clutch cover assembly.

According to a third aspect of the present invention, a clutch cover assembly is provided to press and release a friction member of a clutch disc assembly with a cushioning function against a flywheel of an engine and releasing the pressing. The assembly has a clutch cover, a pressure plate, a diaphragm spring, a first wear compensation mechanism, and a low release load mechanism. The clutch cover is fixed to the flywheel. The pressure plate is nonrotatably fixed to the clutch cover to sandwich the friction member between the flywheel and itself. The diaphragm spring is supported by the clutch cover to urge the pressure plate toward the flywheel. The first wear compensation mechanism maintains a posture of the diaphragm spring in response to wear of the friction member. The low release load mechanism has a first elastic member and a second wear compensation mechanism. The first elastic member is supported by the clutch cover to generate a load counteracting an urging force of the diaphragm spring during a release operation such that pressing load to the pressure plate is progressively decreased as displacement magnitude of the diaphragm spring is increased by the cushioning function of the friction member. The second wear compensation mechanism maintains a posture of the first elastic member by returning the first elastic member to a posture before the wear in response to the wear of the friction member. The second wear compensation mechanism includes a support member, a support and engagement member, and a second elastic member. The support member extends from the pressure plate toward the clutch cover. The support and engagement member is threadedly engaged with the outer circumference of the support member and is given a load in an axial direction opposite the friction member from the first elastic member. The second elastic member always applies torque to the support and engagement member so that the support and engagement member will rotate to move in an axial direction opposite the friction member. The second elastic member is located between the clutch cover and the pressure plate in the axial direction.

In this clutch cover assembly, since the second elastic member is located between the clutch cover and the pressure plate in the axial direction, the second elastic member does not protrude out of the clutch cover. As a result, it is possible to reduce the protrusion of the low release load mechanism from the clutch cover, thereby dramatically reducing the axial dimension of the clutch cover assembly.

A clutch cover assembly according to a fourth aspect of the present invention is the clutch cover assembly of any of the first to third aspects, wherein the support and engagement member covers an end of the support member.

In this clutch cover assembly, since the support and engagement member covers the end of the support member, the screw portion of the support member can be covered with the support and engagement member. In other words, the support and engagement member serves as a dust cover. As a result, a dust cover would not be necessary, thereby further reducing the number of components and the axial dimension.

According to a fifth aspect of the present invention, a clutch cover assembly is provided to press and to release a friction member of a clutch disc assembly with a cushioning function against a flywheel of an engine. The assembly has a clutch cover, a pressure plate, a diaphragm spring, a first wear compensation mechanism, and a low release load mechanism. The clutch cover is fixed to the flywheel. The pressure plate is nonrotatably fixed to the clutch cover to sandwich the friction member between the flywheel and itself. The diaphragm spring is supported by the clutch cover to urge the pressure plate toward the flywheel. The first wear compensation mechanism maintains a posture of the diaphragm spring in response to wear of the friction member. The low release load mechanism has a first elastic member and a second wear compensation mechanism. The first elastic member is supported by the clutch cover to generate a load counteracting an urging force of the diaphragm spring during a release operation such that pressing load to the pressure plate is progressively decreased as displacement magnitude of the diaphragm spring is increased by the cushioning function of the friction member. The second wear compensation mechanism maintains a posture of the first elastic member by returning the first elastic member to a posture before the wear in response to the wear of the friction member. The second wear compensation mechanism includes a support member, a support and engagement member, and a second elastic member. The support member extends from the pressure plate toward the clutch cover. The support and engagement member is threadedly engaged with the outer circumference of the support member and is given a load in an axial direction opposite the friction member from the first elastic member. The second elastic member always applies torque to the support and engagement member so that the support and engagement member will rotate to move in an axial direction opposite the friction member. The support and engagement member covers an end of the support member.

A clutch cover assembly according to a sixth aspect of the present invention is the clutch cover assembly of any of the first to fifth aspects, wherein the support and engagement member includes a support and engagement member main body having a cylindrical shape threadedly engaged with the outer circumference of the support member, an annular engagement portion that is formed at one end of the support and engagement member main body and receives torque from the second elastic member, and a head that covers the other end of the support and engagement member main body.

In this clutch cover assembly, since the support and engagement member has a head, the screw portion of the support member is reliably covered.

A clutch cover assembly according to a seventh aspect of the present invention is the clutch cover assembly of the sixth aspect, wherein axial cross section of the head has a polygonal shape.

In this clutch cover assembly, since the axial cross section of a head has a polygonal shape, it is easy to catch or to grasp the head with a tool. As a result, it is easy to screw the support and engagement member into the support member with a tool, thereby making it easy to assemble the wear compensation mechanism.

A clutch cover assembly according to an eighth aspect of the present invention is the clutch cover assembly of any of the first to seventh aspects, wherein the second wear compensation mechanism further includes a guide plate located between the support and engagement member and the second elastic member in the axial direction to restrict a radial position of one end of the second elastic member near the clutch cover in the axial direction.

In this clutch cover assembly, since the guide plate restricts the radial position of the end of the second elastic member, it is easy to assemble the support and engagement member and the second elastic member. In other words, it is easy to assemble the wear compensation mechanism.

A clutch cover assembly according to a ninth aspect of the present invention is the clutch cover assembly of any of the first to eighth aspects, wherein the first wear compensation mechanism includes a fulcrum member that is located on the pressure plate to function as a fulcrum for the diaphragm spring, an urging mechanism to urge the fulcrum member toward the diaphragm spring, and a limit mechanism to limit a clutch release travel of the pressure plate.

In this clutch cover assembly, since the first wear compensation mechanism has the limit mechanism, it is possible to achieve reliably a wear compensation function.

A clutch cover assembly according to a tenth aspect of the present invention is the clutch cover assembly of the ninth aspect, wherein the limit mechanism is located in the low release load mechanism.

A clutch cover assembly according to an eleventh aspect of the present invention is the clutch cover assembly of the ninth or tenth aspect, wherein the limit mechanism includes a limit member that is fixed to the clutch cover to limit the movement of the pressure plate in an axial direction opposite the friction member.

In this clutch cover assembly, since the limit mechanism has the limit member, it is possible to achieve reliably a wear compensation function.

A clutch cover assembly according to a twelfth aspect of the present invention is the clutch cover assembly of the eleventh aspect, wherein the limit member is located on a side of at least one of the support and engagement member and the first elastic member opposite the friction member in the axial direction for an axial contact therewith.

In this clutch cover assembly, the limit member limits the movement of at least one of the support and engagement member and the first elastic member in the axial direction opposite the friction member. In other words, the axial movement of the pressure plate is limited.

A clutch cover assembly according to a thirteenth aspect of the present invention is the clutch cover assembly of the eleventh aspect, wherein the limit member is located on a side of the pressure plate opposite the friction member in the axial direction for an axial contact therewith.

In the clutch cover assembly, the limit member limits the movement of the pressure plate in an axial direction opposite the friction member.

In a clutch cover assembly according to the present invention, the axial dimension can be shortened by altering the location of the second elastic member or the shape of the support and engagement member.

Also, in a clutch cover assembly according to the present invention, the number of components can be reduced by changing the location of the second elastic member or the shape of the support and engagement member.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 6:
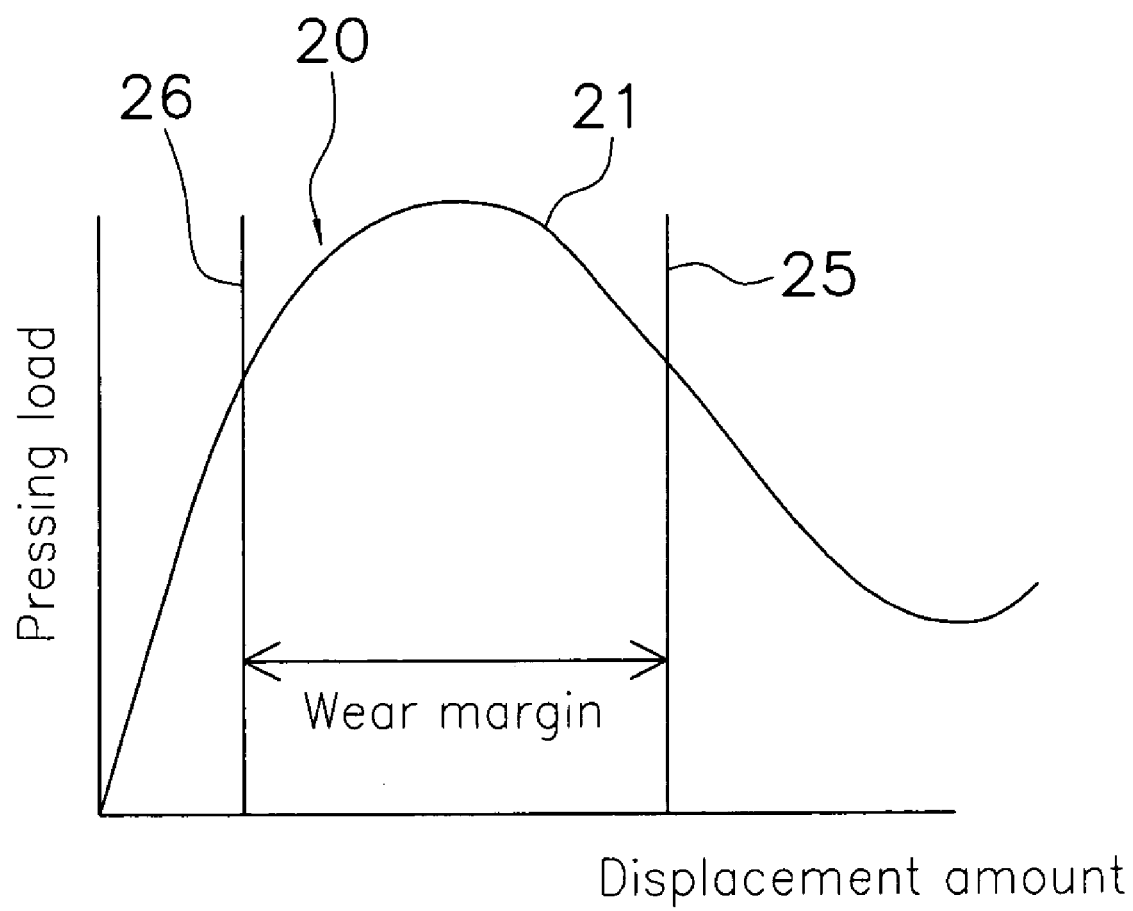
FIG. 6 is a diagrammatic view provided to explain pressing load characteristics.

A description will be made on release load lowering by the cushioning function in the friction member proposed by the inventors. In a case having no cushioning function, as shown in a release load characteristic of FIG. 9, the release load characteristic 60 is linearly changed to a load balance point 63, then gradually decreases, and gradually increases. Clutch release travel of the pressure plate is zero under the load balance point 63. If the friction member has a cushion function, a repulsive force of the cushion starts to move the pressure plate upon the start of the release operation, and the pressure plate has moved to some extent at the load balance point 63. This means that at the load balance point the pressing load is shifted rightward in FIG. 6. As a result, in FIG. 9, the release load at the load balance point 63 becomes smaller to a larger extent than that in a case of having no cushioning function. The reason is that in the pressing load characteristic of FIG. 6, the pressure plate travels though the negative gradient area during the release operation. Therefore, it can be considered that pressure plate travel through the flat area or the positive gradient area if the position of the set line is changed by the wear of the friction member. In the case, it is impossible to obtain a lowering of the release load by the cushioning function of the friction member.

In a structure employing a wear compensation mechanism, the posture of the diaphragm spring is constantly maintained. It means the set line is constantly maintained even if the friction member is worn. In this structure, it is advantageous to set the diaphragm spring so that the higher load can be obtained. However, during the release operation, the pressure plate will travel through the peak portion and the gradient of load becomes flat so that it is impossible to obtain the release load lowering by the cushioning function in the friction member sufficiently. Therefore, a clutch cover assembly employs a low release load characteristic achieving mechanism in order to realize release load lowering by the cushioning function of the friction member even if the position of the set line is changed by the wear of the friction member.

Figure 17:
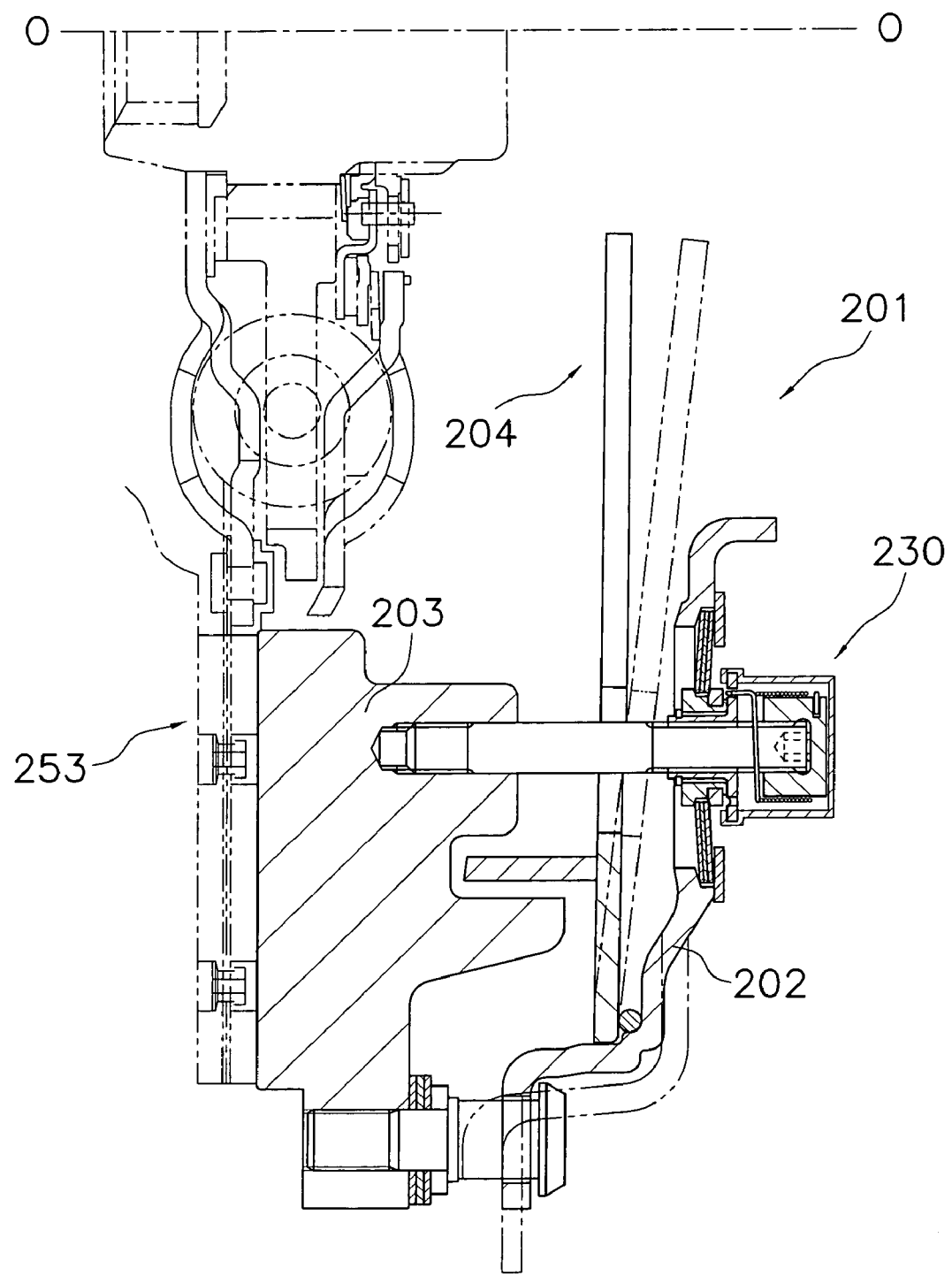
FIG. 17 is a longitudinal cross-sectional diagrammatic of a clutch cover assembly used for comparison to the present invention.
Figure 18:
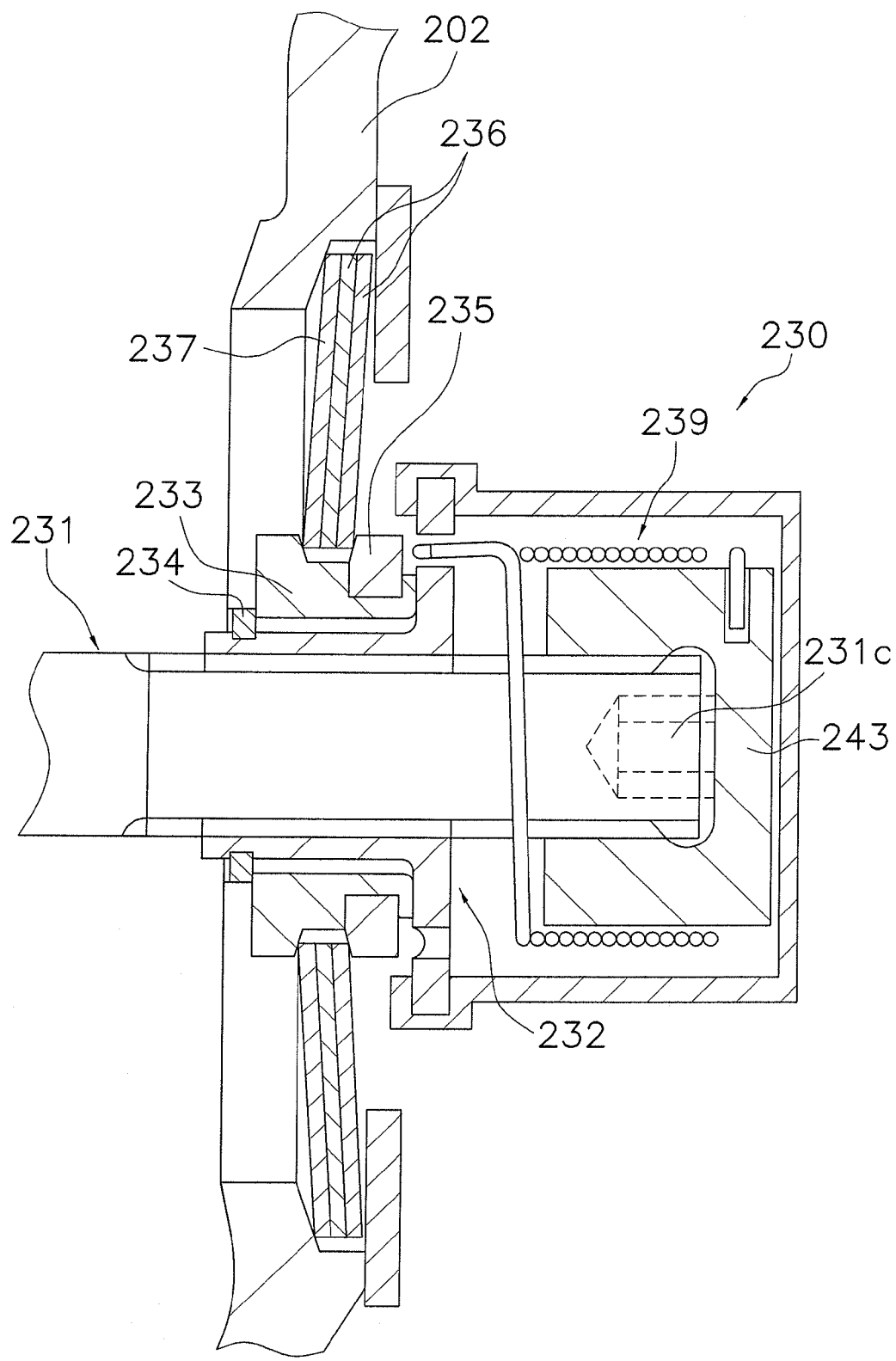
FIG. 18 is a longitudinal cross-sectional diagrammatic view of a low release load characteristic achieving mechanism of the clutch cover assembly of FIG. 17.

FIG. 17 is a longitudinal cross-sectional view of a clutch cover assembly 201 including a pressure plate 203, a diaphragm spring 204, and a mechanism 230 to achieve low release load characteristics, and FIG. 18 is a longitudinal cross-sectional view of the low release load characteristic achieving mechanism 230. The low release load characteristic achieving mechanism 230 is made of a support bolt 231, a holder 232, a first support member 233, a snap ring 234, a second support member 235, a pair of first cone springs 236, a second cone spring 237, and a second adjust spring 239.

As shown in FIG. 18, the second adjust spring 239 is wound around a spring holder 243 fixed to a head 231c of the support bolt 231, and is located on an axial side of the holder 232 opposite the friction member 253 (on the right side of the holder 232 in FIG. 17). As a result, the second adjust spring 239, the head 231c of the support bolt 231, and the spring holder 243 protrude from a clutch cover 202 opposite the friction member 253 in the axial direction to a large extent, thereby increasing the axial dimension of the clutch cover assembly.

As shown in FIG. 18, in the low release load characteristic achieving mechanism 230, the second adjust spring 239, and the screw portions of the support bolt 231 and the second support member 235 are exposed outside of the clutch cover 202. Therefore, a dust cover needs to be installed to prevent invasion of dust into the screw portions and rust of each component. This increases the number of components and further increases the axial dimension of the clutch cover assembly.

(1) Overall Structure of a Clutch Cover Assembly

A pull-type diaphragm spring clutch cover assembly 1 shown in FIG. 1 to FIG. 4 is provided to engage a clutch by pressing a friction member 53 of a clutch disc assembly 52 against a flywheel 51 of an engine, or to disengage a clutch by releasing the pressing load. The friction member 53 has friction facings 53a and cushioning plates 53b so that it has a cushioning function of deflecting within a certain range in an axial direction.

Figure 1:
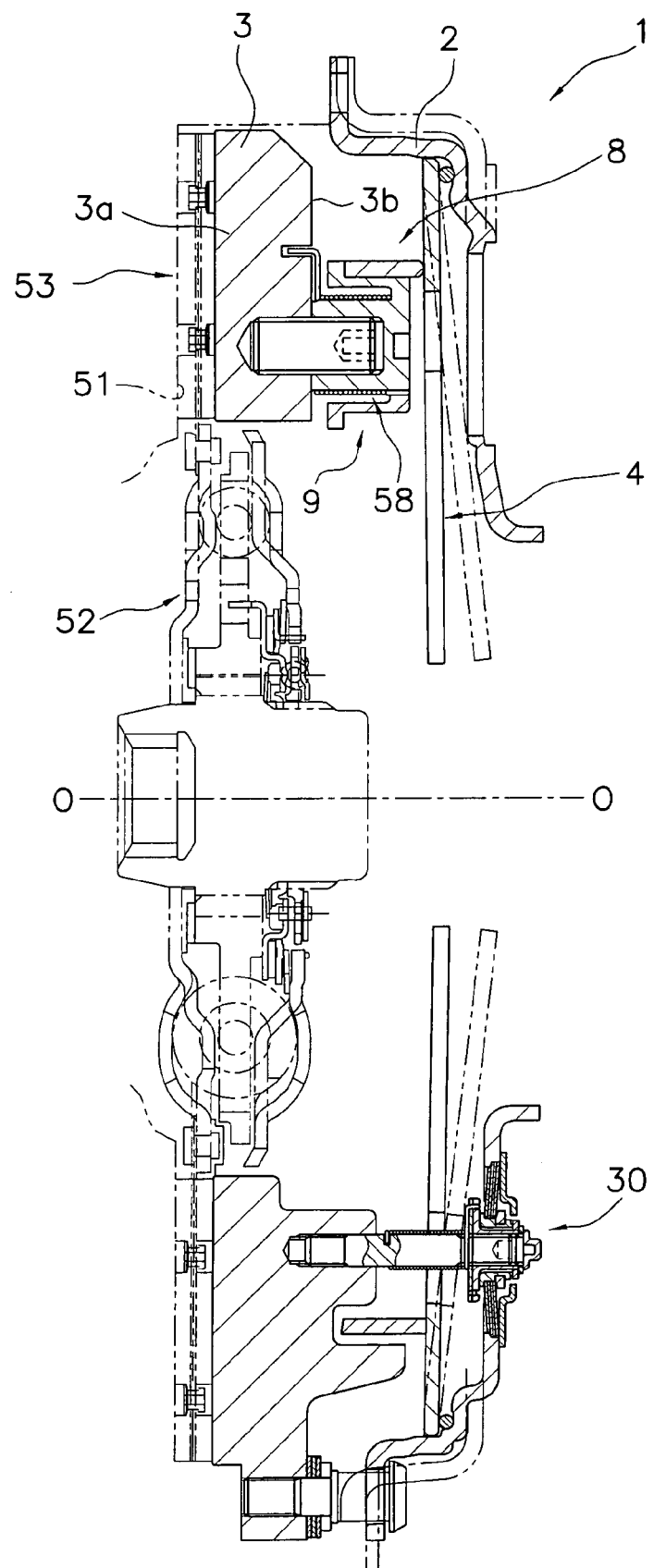
FIG. 1 is a longitudinal cross-sectional view of a clutch cover assembly according to a first embodiment of the present invention.
Figure 2:
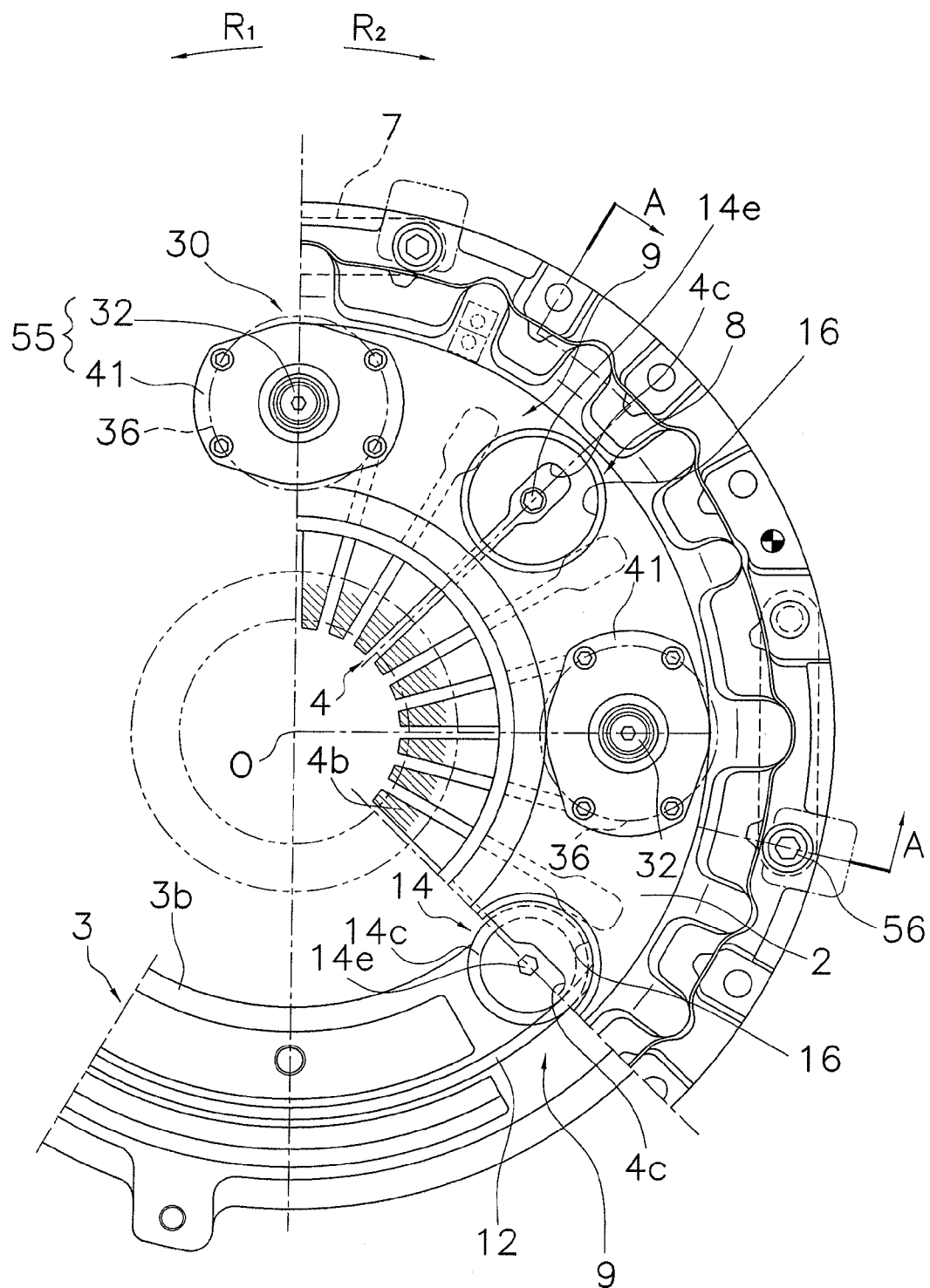
FIG. 2 is an elevational view of the clutch cover assembly with parts removed for explanatory purposes according to the first embodiment of the present invention.
Figure 3:
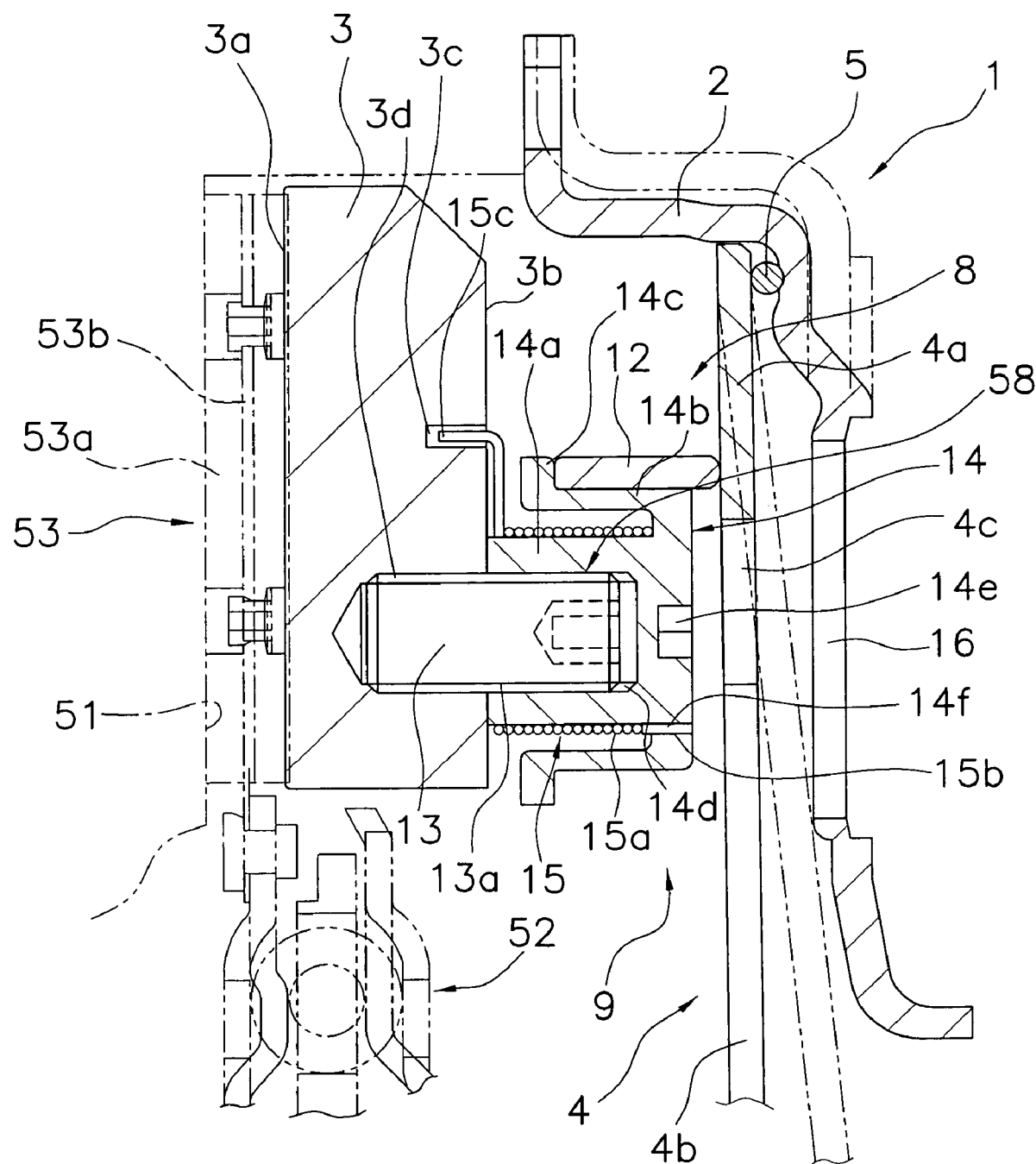
FIG. 3 is an enlarged, partial, longitudinal cross-sectional, diagrammatic view of the clutch cover assembly according to the first embodiment of the present invention.
Figure 4:
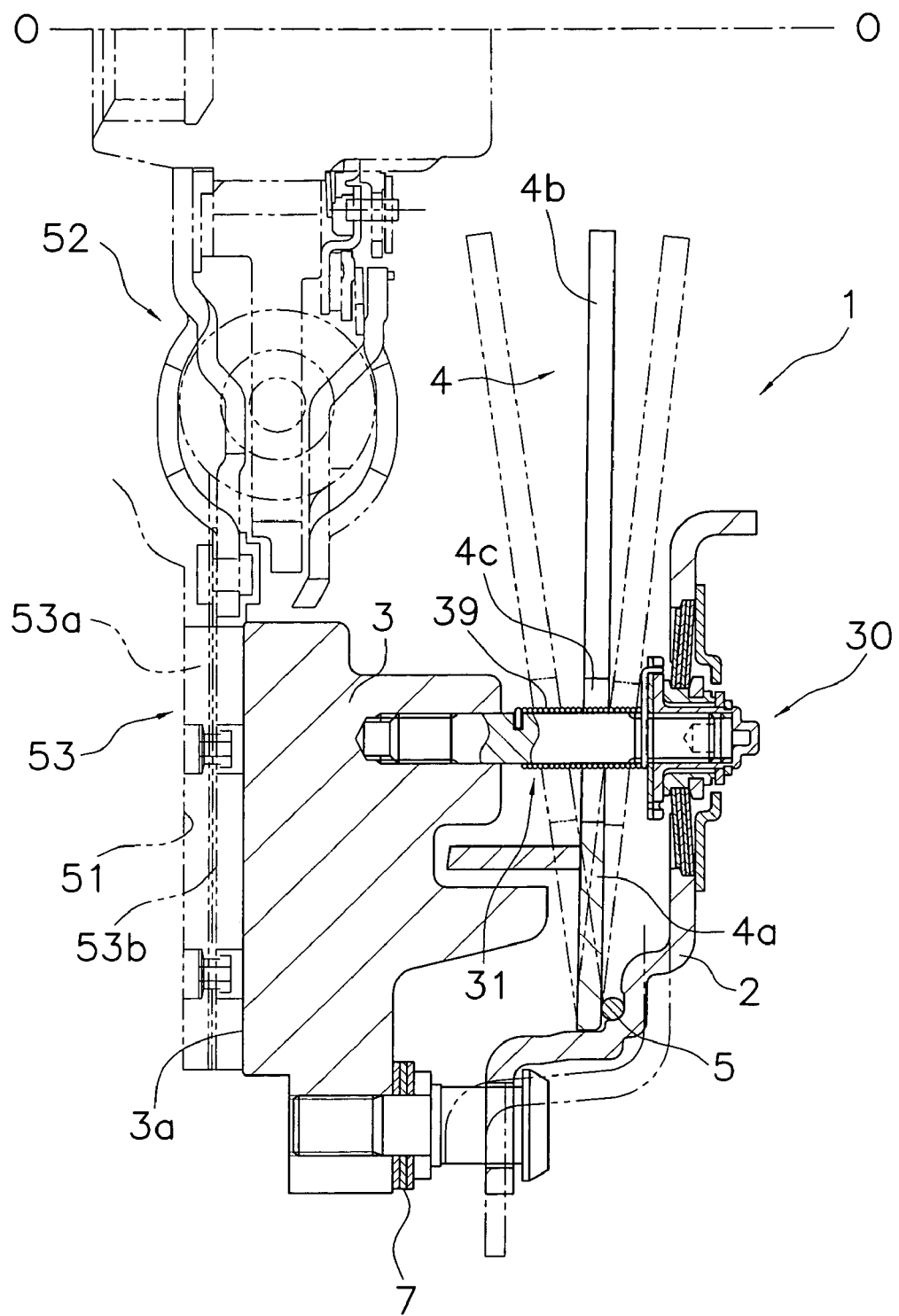
FIG. 4 is an alternate, enlarged, partial, longitudinal cross-sectional, diagrammatic view of a clutch cover assembly according to the first embodiment of the present invention.

A line O-O shown in FIG. 1 is a rotational axis of the flywheel 51 and the clutch cover assembly 1. The left side in figures will be referred to as "axial engine-side", and the right side in figures will be referred to as "axial transmission-side". Arrow R1 direction shown in FIG. 2 indicates a rotational direction of the clutch device, and arrow R2 direction is the opposite. It should be noted that positions and postures of each component in FIGS. 1, 3 and 4 are those in an initial stage in which the clutch is engaged and the friction member 53 of the clutch disc assembly 52 is not worn.

As seen in FIG. 1, the clutch cover assembly 1 is provided to transmit or interrupt torque from the flywheel 51 to the clutch disc assembly 52, and mainly includes a clutch cover 2, a pressure plate 3, and a diaphragm spring 4.

The clutch cover 2 is an approximately dish-shaped plate member, and has a radially outer end fixed to the flywheel 51 by bolts, for example. The clutch cover 2 has a disc portion counteracting a radially outer portion of the flywheel 51 with a gap therebetween in the axial direction.

The pressure plate 3 is an annular member that is located within the clutch cover 2, and between the friction facing 53a of the clutch disc assembly 52 and the clutch cover 2 in the axial direction. The pressure plate 3 is formed with an annular and flat pressing surface 3a facing the flywheel 51. The pressure plate 3 is formed with a second axial surface 3b on a second side thereof in the axial direction facing the clutch cover 2. The friction member 53 of the clutch disc assembly 52 is provided between the pressing surface 3a and the flywheel 51. As seen in FIG. 2, the pressure plate 3 is connected to the clutch cover 2 by a plurality of strap plates 7 so that it can move relative to the clutch cover 2 in the axial direction but not in the rotational direction. Specifically, each of the strap plates 7 has a R2-side end fixed to the outer periphery of the pressure plate 3 by bolts 56 and a R1-side end fixed to the clutch cover 2 by rivets. This connection allows the pressure plate 3 to rotate integrally with the clutch cover 2 in the R1 direction. In addition, the strap plates 7 are deflected in the axial direction in a clutch engagement state to apply an urging force to the pressure plate 3 toward the transmission in the axial direction.

Referring to FIGS. 1 to 3, the diaphragm spring 4 is a disc-like member that is located between the pressure plate 3 and the clutch cover 2, and has an annular elastic portion 4a and a plurality of lever portions 4b extending radially inward from an inner periphery of the annular elastic portion 4a. The annular elastic portion 4a has a radially inner portion that is in contact with a fulcrum ring 12 (later described). The annular elastic portion 4a has a radially outer portion that is supported by the clutch cover 2 via a wire ring 5. In this state, the annular elastic portion 4a urges the pressure plate 3 toward the flywheel 51 via a first wear compensation mechanism 8 (later described). Slits are formed between the lever portions 4b of the diaphragm spring 4, each slit having an oval hole 4c at the radially outer end thereof. A pull-type release device (not shown), including a release bearing and so on, is engaged with tips of the lever portions 4b of the diaphragm spring 4.

(2) First Wear Compensation Mechanism

Next, a first wear compensation mechanism 8 will be described. As shown in detail in FIG. 3, the purpose of the first wear compensation mechanism 8 is to return a posture of the diaphragm spring 4 to the initial one after the friction facings 53a of the clutch disc assembly 52 are worn, that is, to maintain a constant pressing load of the diaphragm spring 4 to the pressure plate 3.

The first wear compensation mechanism 8 mainly includes the fulcrum ring 12 and an urging mechanism 9. The first wear compensation mechanism 8 is installed on the pressure plate 3, and the fulcrum ring 12 is, as a member installed on the pressure plate 3, supported by a second screw member 14. The urging mechanism 9 applies a load to the fulcrum ring 12 in the direction opposite to the pressure plate 3.

The fulcrum ring 12 is an annular ring member that has a cylindrical shape extending in the axial direction. The fulcrum ring 12 is disposed on an axial transmission side of the pressure plate 3.

The urging mechanism 9 is composed of a plurality of mechanisms that are located on the second axial surface 3b of the pressure plate 3. The mechanisms are arranged in a circumferential direction, each of the mechanisms having a first screw member 13, a second screw member 14, and a first adjust spring 15. The first screw member 13 is a rod like member that extends in the axial direction and is formed with a screw 13a over an outer circumference thereof. The first screw member 13 has an axially engine-side portion screwed into a screw hole 3d of the pressure plate 3, and has an axially transmission-side portion extending from the pressure plate 3 further toward the transmission in the axial direction. The second screw member 14 is located corresponding to the first screw member 13. The second screw member 14 is a nut member that has a cylindrical main body 14a, and is formed with a screw 14d (screw hole) on the axially engine-side surface into which the first screw member 13 is screwed. This screw portion constitutes a first feed screw mechanism 58 in which the second screw member 14 is moved toward the transmission in the axial direction when the second screw member 14 is rotated relative to the first screw member 13 in one rotational direction. In an initial state shown in FIG. 3, an axially engine-side end of the second screw member 14 is adjacent with or in contact with the second axial surface 3b of the pressure plate 3. The second screw member 14 has a flange 14b that extends radially outward form the axially engine-side end of the main body 14a. The flange 14b is a portion to support the fulcrum ring 12, and extends cylindrically toward the engine in the axial direction. The flange 14b has an annular support portion 14c that extends radially outward from a tip thereof. As clearly shown in FIG. 2 and FIG. 3, the fulcrum ring 12 has an axially engine-side end supported by the support portion 14c of the second screw member 14 (in contact with only a part of the support portion 14c), and an axially transmission-side end supported by a radially inner portion of the annular elastic portion 4a of the diaphragm spring 4. The support portion 14c supports the fulcrum ring 12 in the axial direction, and the flange 14b supports the fulcrum ring 12 in the radial direction. In other words, although the fulcrum ring 12 is supported by the second screw members 14 in the axial direction and can rotate relatively around an axis on the clutch center, they are not necessary conditions. Each of the second screw members 14 can rotate around an axis on its center relative to the fulcrum ring 12.

The first adjust spring 15 is a member provided to move the second screw member 14 toward the transmission in the axial direction by providing an urging force to the second screw member 14 in one rotational direction. The first adjust spring 15 has a coil portion 15a, a first arm portion 15b, and a second arm portion 15c. The coil portion 15a is located around the main body 14a of the second screw member 14. The first arm portion 15b has a tip inserted into a hole 14f formed in the second screw member 14. The second arm portion 15c has a tip inserted into a hole 3c of the pressure plate 3.

The second screw member 14 has an axially transmission-side end surface formed with a hex socket 14e. The hex socket 14e corresponds to the hole 4c of the diaphragm spring 4 and a hole 16 of the clutch cover 2. The hole 16 has a circular shape larger than the hole 4c. Accordingly, by inserting a tool into the hex socket 14e and rotating it, an axial position of the second screw member 14 can be adjusted. This operation is necessary when the friction facings 53a of the clutch disc assembly 52 are exchanged due to wear and the same clutch cover assembly 1 is used again.

In summary, in this first wear compensation mechanism 8, since height adjustment of the fulcrum ring 12 is performed by the feed screw mechanism, it is easy to manufacture it and well-suited to small production. Particularly, it is easier to manufacture it and to process it maintaining high accuracy compared to the structure of the clutch cover assembly of FIG. 17 that has a plurality of inclined surfaces both on the fulcrum ring and the pressure plate. As a result, the cost is lower. In addition, since the feed screw mechanism is used, even if the impact is input, the urging mechanism is not likely to change the axial position of the fulcrum ring.

Moreover, since the feed screw mechanism is down-sized, it is easy to process each component. Therefore, the cost is lowered and the accuracy is improved. In addition, since it is easy to cover the screw portion because of its structure and it is not open outward in this embodiment, dust is unlikely to go into the screw portion and rust is unlikely to be generated.

(3) Low Release Load Characteristic Achieving Mechanism

Figure 9:
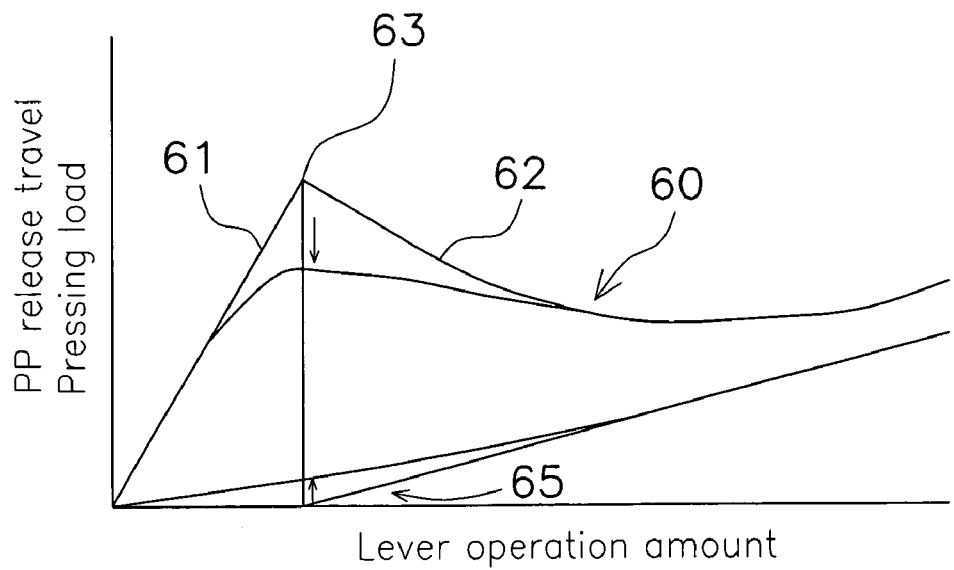
FIG. 9 is a diagrammatic view to explain release load characteristics.

Referring to FIG. 2 and FIG. 4, a description will be made of a mechanism 30 that achieves low release load characteristics. The low release load characteristic achieving mechanism 30 is a release assist mechanism to realize a release load lowering by a cushioning function in the friction member 53 even if the friction member 53 is worn. First, referring to FIG. 9, the release load lowering by the cushioning function of the friction member. In a case of no cushioning function, the release load characteristic 60 linearly increases to a peak, i.e., a load balance point 63, gradually decreases from the peak, and then gradually increases. It should be noted that the clutch release travel 65 of the pressure plate is zero up to the load balance point 63. If the friction member has a cushion function, the movement of the pressure plate becomes faster at the release operation, more specifically, the clutch release travel 65 of the pressure plate increases faster when compared to a case with no cushioning plate. In FIG. 9, the peak at the load balance point 63 is decreased to a large extent, realizing low release load characteristics. The reason why the above-mentioned result is obtained is that a position of the pressure plate moves during a release operation in a negative gradient direction (right direction) in the pressing load characteristics in FIG. 6. Accordingly, if the position of the set line is changed because of the wear of the friction member, the pressure plate may move during the release operation travel through the flat portion or the positive gradient portion, but in the embodiment of the present invention, the set line is constant due to the first wear compensation mechanism 8. Even if the initial setting of the set line is positioned in the flat portion or the positive gradient portion because of the design objective, in the embodiment of the present invention, the low release load characteristic achieving mechanism 30 operates to generate compulsorily the negative load gradient during the release operation, combined with effects of the cushioning function of the clutch disc, thereby realizing a low release load.

Figure 5:
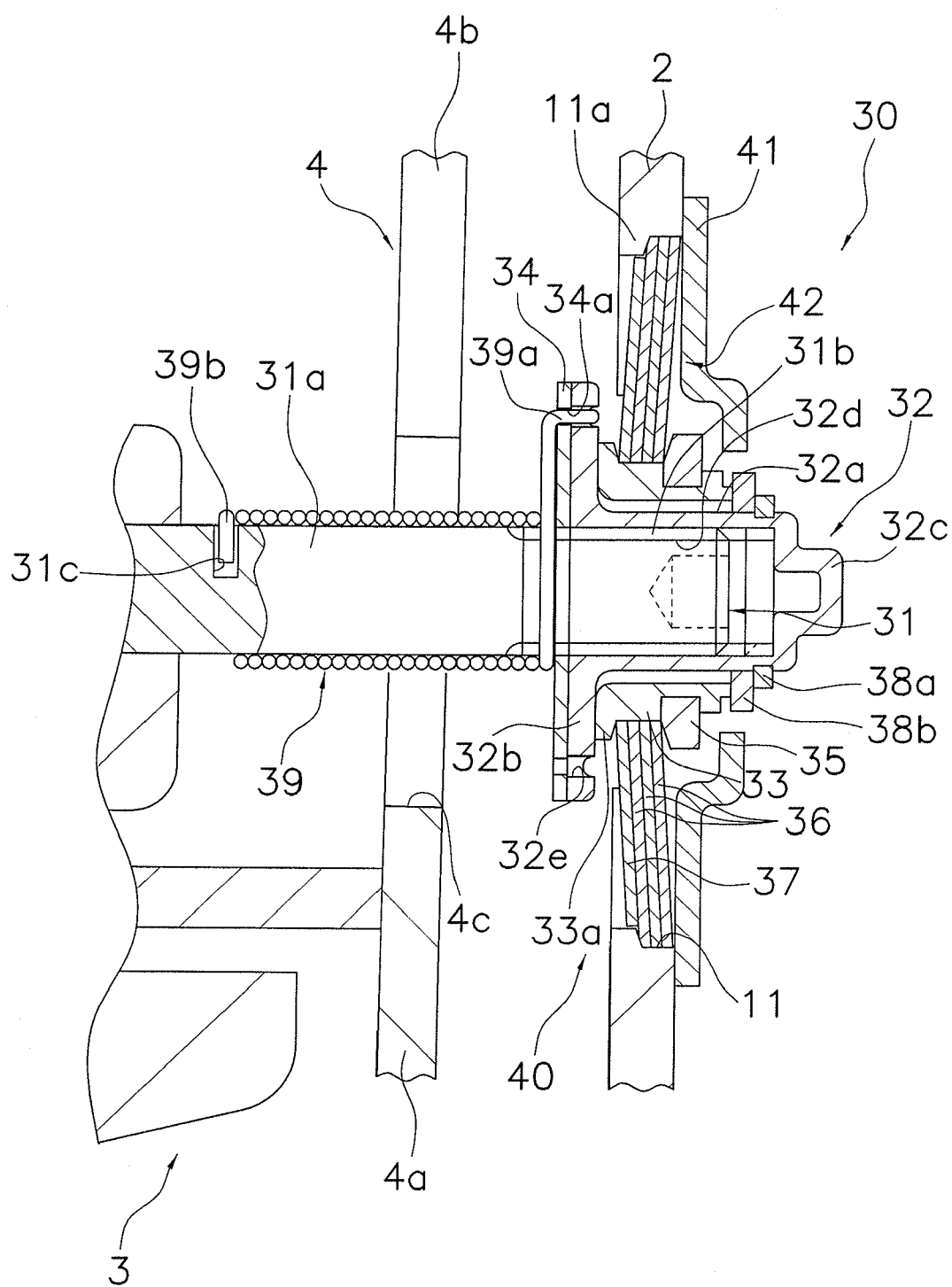
FIG. 5 is a fragmentary enlarged view of FIG. 4 to depict a low release load characteristic achieving mechanism of the clutch cover assembly.

The low release load characteristic achieving mechanisms 30 are, as shown in FIG. 2, alternately located at the same radial position as the urging mechanisms 9 of the first wear compensation mechanism 8. The low release load characteristic achieving mechanisms 30 are positioned at a total of four positions in this embodiment. The low release load characteristic achieving mechanism 30 includes, as shown in FIGS. 4 and 5, a support bolt 31 (support member), a holder 32 (support and engagement member), a first support member 33, a snap ring 38a, an intermediate member 38b, a second support member 35, three first cone springs 36 (first elastic member), a second cone spring 37 (first elastic member), and a second adjust spring 39 (second elastic member).

The support bolt 31 extends from the second axial surface 3b of the pressure plate 3 toward the transmission in the axial direction. The support bolt 31 has a base 31a and a screw portion 31b. The base 31a penetrates the oval hole 4c of the diaphragm spring 4. Around the perimeter of the base 31a is wound the second adjust spring 39 (second elastic member), as later described. The screw portion 31b is a portion whose surface is formed with a spiral screw, and is located within the hole 11 in the clutch cover 2. The hole 11 has an approximately circular shape.

The holder 32 is a member provided to receive a load opposite the friction member 53 in the axial direction from the first cone springs 36 and the second cone spring 37, and includes a holder main body 32a (support and engagement member main body), a flange portion 32b (engagement portion), and a head 32c. The holder main body 32a is a portion extending cylindrically in the axial direction, and has an inner circumference formed with a screw 32d to be threadedly engaged with the screw portion 31b. The holder main body 32a is threadedly engaged with the screw portion 31b of the support bolt 31. In a state shown in FIG. 5, a part of the screw portion 31b corresponds to a portion on a side of the holder main body 32a toward the transmission in the axial direction.

The flange portion 32b is an annular portion extending radially outward from an axially engine-side end of the holder main body 32a, and is integrally molded with the holder main body 32a. The flange portion 32b is formed with a plurality of holes 32e that penetrate in the axial direction. A first engagement end 39a of the second adjust spring 39 penetrates through the hole 32e, and the flange portion 32b receives torque from the second adjust spring 39.

The head 32c is a portion formed to cover an axially transmission-side end of the holder main body 32a, and has a hexagonal shape in an axial cross section. The shape of the head 32c may be a polygon other than a hexagon. As shown in FIG. 5, the holder 32 covers the end of the support bolt 31 when it is threadedly engaged with the screw portion 31b.

The first support member 33 is a tubular member disposed around the holder 32. The holder 32 has an axially transmission-side end having an outer surface around which the snap ring 38a is fitted. The intermediate member 38b is sandwiched between the end of the first support member 33 and the snap ring 38a. In other words, the first support member 33 is held so that it cannot move in the axial direction with a gap between itself and the holder 32. It should be noted that a gap is defined between the inner circumference of the first support member 33 and the outer circumference of the holder 32 in the radial direction so that both members can rotate relative to each other. The second support member 35 is an annular member that is fixed to an outer surface of the axially transmission-side end of the first support member 33. As described above, the holder 32, the first support member 33, and the second support member 35 constitute one assembly that can move in the axial direction as one member.

The three first cone springs 36 are stacked to operate in parallel with each other. The first cone spring 36 has an inner periphery in contact with the second support member 35 from the axially engine-side, and outer periphery in contact with the annular protrusion 11a formed in the hole 11 of the clutch cover 2 from the axially transmission-side. The second cone spring 37 has an inner periphery in contact with the annular protrusion 33a of the first support member 33 from the axially transmission-side, and an outer periphery in contact with the first cone spring 36 from the axially engine-side. As a result, no spacer is provided between the first cone springs 36 and the second cone spring 37 in the axial direction.

Consequently, the first cone springs 36 can apply a load to the assembly including the holder 32 and so on toward the transmission in the axial direction, and the second cone spring 37 can apply a load to the assembly including the holder 32 and so on toward the engine in the axial direction. The first and second cone springs 36 and 37 do barely apply a load to the holder 32 in a clutch engagement state, but they apply a load to the holder 32 toward the transmission in the axial direction during a clutch release operation to lower the release load. In other words, the load of the first cone springs 36 is larger than that of the second cone spring 37.

The second adjust spring 39 is a torsion coil spring, and is located between the clutch cover 2 and the pressure plate 3 in the axial direction, more specifically, on a side of the holder 32 toward the engine in the axial direction (near the friction member 53). A guide plate 34 is a circular plate member and is located between the second adjust spring 39 and the holder 32 in the axial direction. The second adjust spring 39 is wound around the base 31a of the support bolt 31, and the first engagement end 39a (one end) of the second adjust spring 39 penetrates through the hole 34a (second hole) of the guide plate 34 and is inserted into the hole 32e of the holder 32. A second engagement end 39b of the second adjust spring 39 is fitted into a hole 31c of the support bolt 31, so that the second adjust spring 39 is attached to the support bolt 31. In other words, when the second adjust spring 39 is wound up, the second adjust spring 39 applies a substantially constant load to the holder 32 in one rotational direction. In this case, the load applying direction of the second adjust spring 39 is a direction in which the holder 32 moves toward the transmission in the axial direction along the screw portion 31b.

As clearly understood from the above-described structures, since the second adjust spring 39 is located between the clutch cover 2 and the pressure plate 3 in the axial direction, and on the axially engine-side of the holder 32, the second adjust spring 39 does not project outward of the clutch cover 2 (more specifically, on the axially transmission side of the clutch cover 2). As a result, it is possible to reduce projection of the low release load characteristic achieving mechanism 30 from the clutch cover 2 so that the axial dimension of the clutch cover assembly 1 can be dramatically shortened.

Also, in this clutch cover assembly 1, since the holder 32 covers the end of the support bolt 31, the screw portion of the support bolt 31 can be covered by the holder 32. In other words, the holder 32 serves as a dust cover. As a result, the dust cover, which is necessary in the clutch cover assembly of FIG. 17, is no longer required so that the number of components is reduced and the axial dimension of the clutch cover assembly is shortened further. Additionally, since the holder 32 has the head 32c, it is possible to cover reliably the screw portion of the support bolt 31.

Figure 7:
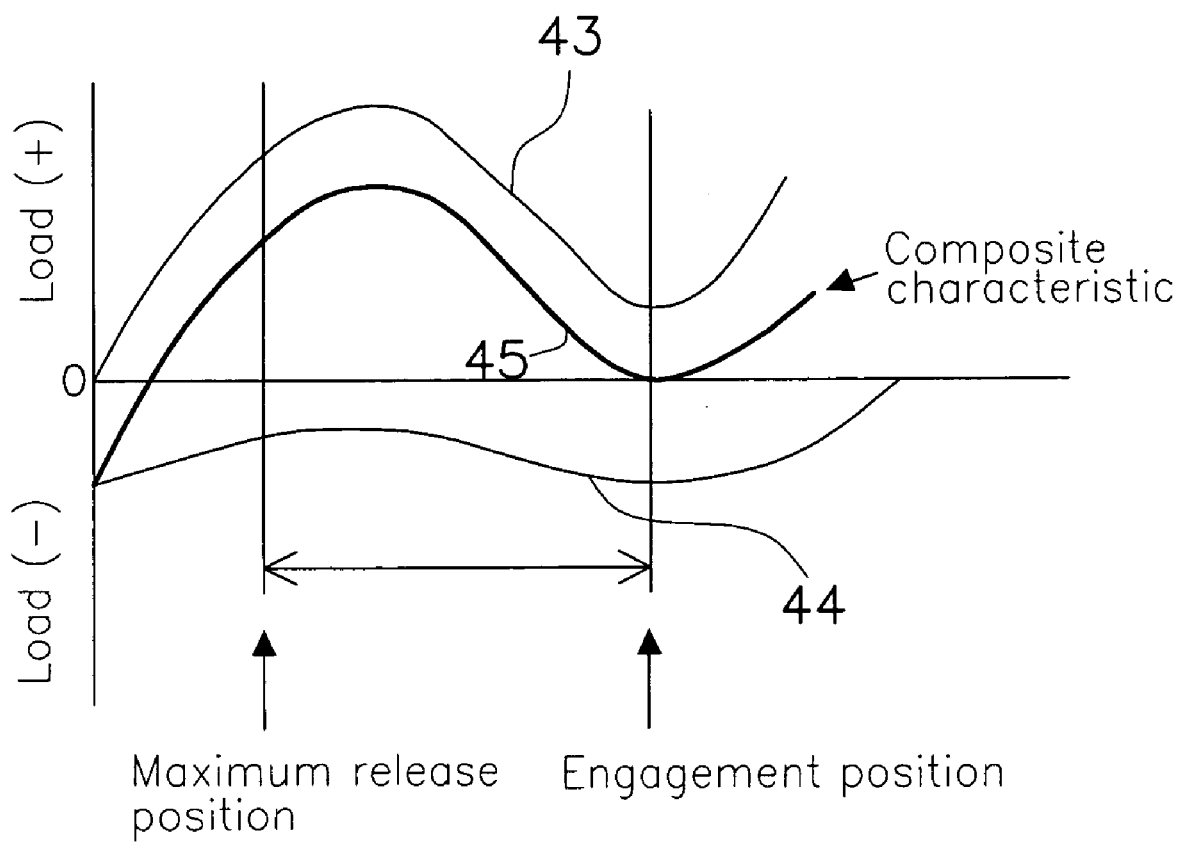
FIG. 7 is a diagrammatic view provided to explain composite characteristics of the low release load characteristic achieving mechanism.
Figure 8:
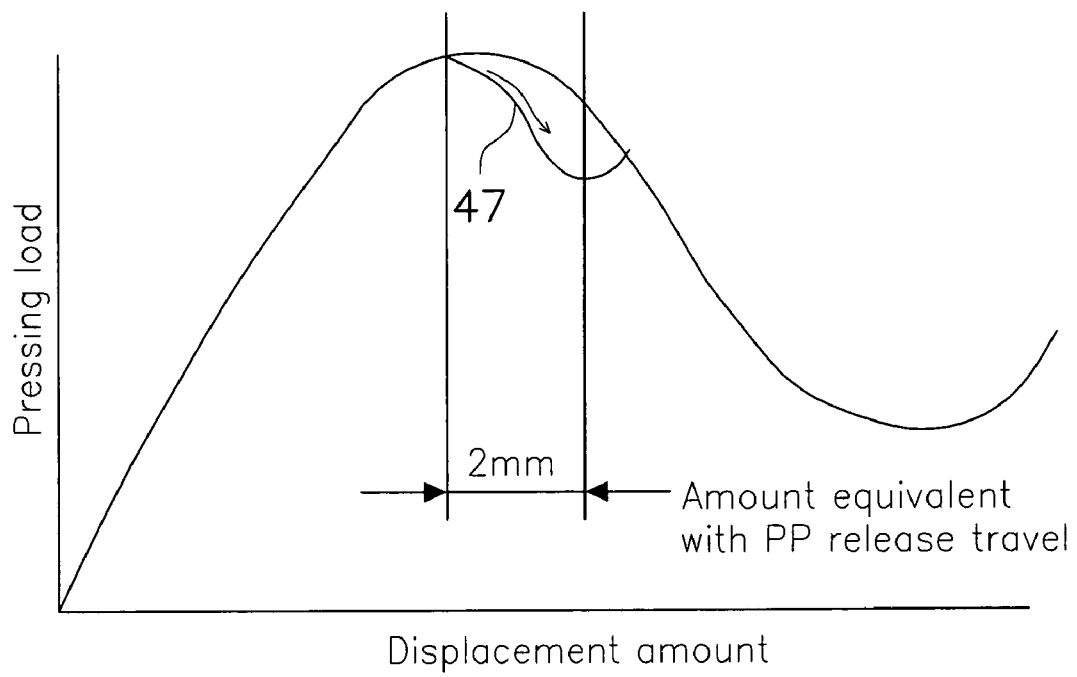
FIG. 8 is a diagrammatic view to explain negative gradient characteristics that are obtained when the cushioning function is fulfilled in the set load characteristics.

The operation of the low release load characteristic achieving mechanism 30 will be described. As shown in FIG. 7, the characteristic 43 of the first cone springs 36 generates a load toward the positive side (toward the transmission in the axial direction), the characteristic 44 of the second cone spring 37 generates a load toward the negative side (toward the engine in the axial direction). In the characteristic 43 of the first cone springs 36, the difference between the bottom and the peak is large, and the gradient is large. In the characteristic 44 of the second cone spring 37, the difference between the bottom and the peak is small, and the gradient is small. In the composite characteristic 45, the bottom is positioned in the clutch engagement position, having zero load. Preferably, the bottom load of the composite characteristics 45 is designed to be zero or lower. As the characteristic shifts from the zero load point toward the maximum release position, the load increases gradually toward the positive side. This phenomenon is seen in the set load characteristic in FIG. 8: even if the set line is set at the peak position of the load characteristic, when the release operation is performed, the cushion function of the friction member 53 shifts the set line toward the maximum displacement magnitude like the line 47. In other words, negative gradient is always ensured in the pressing characteristic so that the release load lowering is reliably realized by the cushion function.

Referring to FIG. 5, in a clutch engagement state, a force (torque) to rotate the holder 32 by the second adjust spring 39 and the friction force at the screw faces by the composite load (axial load) of the cone springs 36 and 37 are balanced. Consequently, in this state, the axial load to the support bolt 31 has a value a little bit larger than zero. When the friction member 53 is worn, the support bolt 31 and the holder 32 move toward the engine in the axial direction. Then, the cone springs 36 and 37 are deformed further, and the loads of these components are lowered to disrupt the load balance. At this time, the second adjust spring 39 rotates the holder 32 to move it toward the engine in the axial direction. Then, the axial composite load by the cone springs 36 and 37 increases and the friction force at the screw face shows a proportional increase. As a result, it becomes impossible to rotate the holder 32 by the torque of the second adjust spring 39, and the holder 32 stops the axial movement. As mentioned before, even if the friction member 53 is worn, the postures of the cone springs 36 and 37 in the low release load characteristic achieving mechanism 30 return to the initial states. In other words, the second wear compensation mechanism is realized in the low release load characteristic achieving mechanism 30, therefore the postures of the cone springs 36 and 37 are maintained even if the friction member 53 is worn to maintain a constant load of the low release load characteristic achieving mechanism 30.

It should be noted that, as shown in FIG. 5, a gap 42 is formed in the clutch engagement state between the first cone springs 36 and a support ring 41. More specifically, a gap corresponding to a release travel of the pressure plate is defined between the radially inner portion of the support ring 41 and the first cone spring 36. On the other hand, since the first cone springs 36 have a conical shape such that the radially inner portion is positioned on the axially engine-side of the radially outer portion, the gap 42 increases gradually from the radially inner side to the radially outer side. In the release operation, since the pressure plate 3, the support bolt 31, and the holder 32 move toward the transmission in the axial direction, the radially inner portions of the cone springs 36 are pulled up toward the transmission in the axial direction. When the holder 32 is brought into contact with the inner circumference of the support ring 41, the pressure plate 3 and the holder 32 stop moving in the axial direction. In summary, the support ring or limit member 41 and the holder 32 constitute a stopper limit mechanism 55 that restricts or limits the release travel of the pressure plate. Since the low release load characteristic achieving mechanism 30 has a function of the stopper mechanism 55 of the first wear compensation mechanism 8 as described above, the structure is simplified and the number of components decreases. Additionally, in the release state, although in the low release load characteristic achieving mechanism 30 the axial load is applied from the support bolt 31 to the holder 32, over adjustment is unlikely to occur in the first wear compensation mechanism 8 because the screw engagement generates a large load in the axial direction.

Furthermore, even if the friction member 53 is worn, as described before, the postures of the first and second cone springs 36 and 37 in the low release load characteristic achieving mechanism 30 return to the initial state. In other words, even if the friction member 53 is worn, the gap 42 in the stopper mechanism 55 maintains a constant magnitude.

(4) Assembling of the Low Release Load Characteristic Achieving Mechanism 30

The assembling of the low release load characteristic achieving mechanism 30 will be described referring to FIG. 5.

First, a cone spring assembly 40, which is made of the first cone springs 36, the second cone spring 37, the first support member 33, and the second support member 35, is pre-assembled. More specifically, one second cone spring 37 and three first cone springs 36 are assembled on the outer circumference of the first support member 33. Next, the second support member 35 is fitted into the first support member 33, and the first cone springs 36 and the second cone spring 37 are sandwiched between the first support member 33 and the second support member 35 in the axial direction. Then, the second support member 35 is fixed to the first support member 33 by welding, for example, while the first cone springs 36 and the second cone spring 37 are compressed. As a result, the cone spring assembly 40 is assembled from the first cone springs 36, the second cone spring 37, the first support member 33, and the second support member 35.

Meanwhile, the support bolt 31 is screwed into the pressure plate 3. The second adjust spring 39 is inserted into the base 31a of the support bolt 31, and then the second engagement end 39b of the second adjust spring 39 is inserted into the hole 31c of the base 31a. Then, the first engagement end 39a of the second adjust spring 39 is inserted into the hole 34a (second hole) of the guide plate 34.

Next, the holder 32 is screwed into the screw portion 31b while the second adjust spring 39 and the guide plate 34 are assembled into the support bolt 31. Since the second adjust spring 39 is located on the axially engine-side of the holder 32, it is easier to perform the screwing operation of the holder 32 compared to the clutch cover assembly of FIG. 17. In addition, since the shape in the axial cross section of the head 32c of the holder 32 is hexagonal as described before, it is easy to screw the holder 32 with a wrench or the like, thereby making it easy to assemble the low release load characteristic achieving mechanism 30.

When the holder 32 is screwed into the screw portion 31b, the holder 32 moves toward the pressure plate 3 and before long the first engagement end 39a and the flange portion 32b of the holder 32 get into contact with each other in the axial direction. At this time, since the first engagement end 39a of the second adjust spring 39 is inserted into the hole 34a of the guide plate 34, the first engagement end 39a is positioned in the radial direction. In addition, since the radial position of the hole 32e of the flange portion 32b is substantially the same as that of the hole 34a of the guide plate 34, the radial position of the first engagement end 39a of the second adjust spring 39 substantially corresponds to that of the hole 32e of the flange portion 32b. Accordingly, compared to a case not having the guide plate 34, it is easier to hook the first engagement end 39a of the second adjust spring 39 into the hole 32e of the holder 32, and to assemble the holder 32 and the second adjust spring 39. It is considered that it may be difficult to achieve the winding operation of the second adjust spring 39 and the installing operation of the second adjust spring 39 to the holder 32 since the second adjust spring 39 should be located on the axially engine-side of the holder 32. The guide plate 34, however, solves these problems as described above.

The holder 32 is further screwed, while the first engagement end 39a of the second adjust spring 39 is hooked into the hole 32e of the holder 32. In a state that the holder 32 is screwed into the support bolt 31 up to a certain position in the axial direction, the cone spring assembly 40 and the intermediate member 38b are fitted around the first support member 33. Then, the snap ring 38a is fitted around the holder 32, so that the cone spring assembly 40 is assembled into the holder 32.

As described above, in this clutch cover assembly 1, by designing locations of the second adjust spring 39 and the holder 32 and providing the guide plate 34, the performance of assembling the low release load characteristic achieving mechanism 30 is improved dramatically.

(5) Clutch Engagement Operation and Release Operation

Referring to FIG. 4 in this clutch cover assembly 1, when a release device (not shown) pulls out the tips of the lever portions 4b of the diaphragm spring 4 toward the transmission, the radially inner portion of the annular elastic portion 4a of the diaphragm spring 4 is pulled up toward the transmission in the axial direction at the wire ring 5 as a fulcrum. By this operation, the annular elastic portion 4a no longer presses the pressure plate 3, the pressure plate 3 is separated from the friction member 53 by the strap plates 7, and finally the friction member 53 leaves the flywheel 51 (in a clutch disengagement state).

In a state that the release device (not shown) does not apply the load to the tips of the lever portions 4b of the diaphragm spring 4, the annular elastic portion 4a applies the pressing load to the pressure plate 3. As a result, the friction member 53 of the clutch disc assembly 52 is pressed against the flywheel 51, so that torque is transmitted to the clutch disc assembly 52 (in a clutch engagement state).

Figure 10:
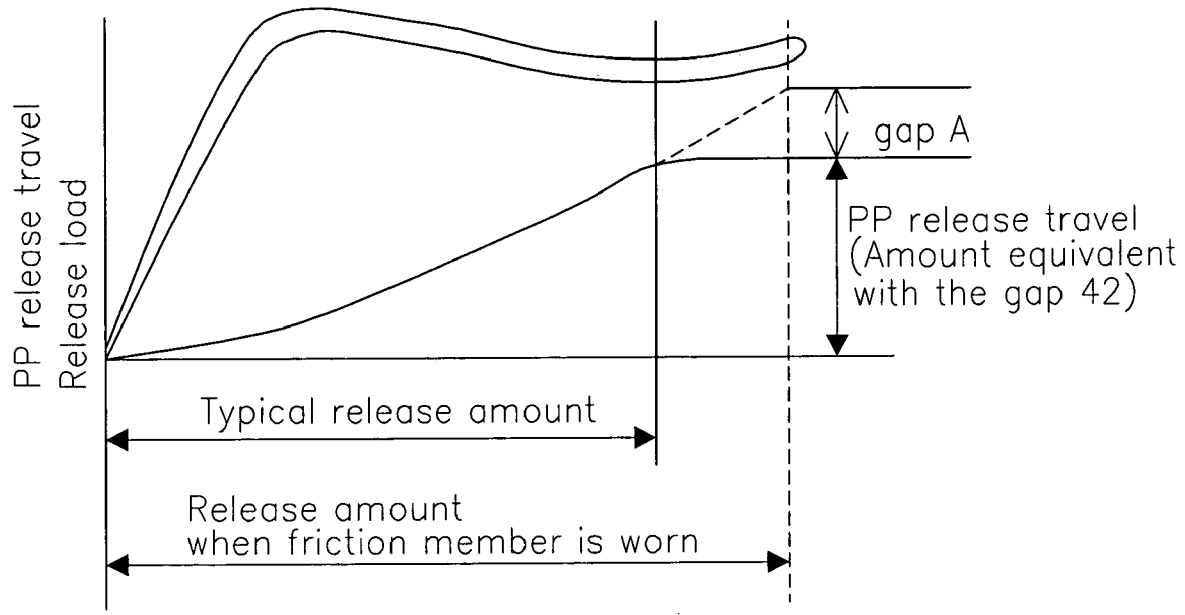
FIG. 10 is a diagrammatic view of the release load characteristics provided to explain a first wear compensation mechanism and a clutch release travel characteristic a the pressure plate of the clutch cover assembly.

Referring to FIGS. 4 and 5, in this engagement state, when the friction facings 53a are worn, the pressure plate 3 moves toward the flywheel 51. Accordingly, in the low release load characteristic achieving mechanism 30, the support bolt 31, the holder 32, and so on move toward the engine in the axial direction, too. As a result, the cone springs 36 and 37 deform to increase the gap 42 between themselves and the support ring 41. However, the cone spring load and the axial force of the holder 32 generated by the torque of the adjust spring are imbalanced, and the torque of the second adjust spring 39 rotates the holder 32 and postures of the cone springs 36 and 37 return to the initial ones, and the magnitude of the gap 42 returns to the original constant one. Meanwhile, in this state, the pressure plate 3 is displaced toward the flywheel 51 by the wear of the friction member 53, so that the axial position of the tips of the diaphragm spring 4 is changed. In the present invention, the release travel is determined by the position of the inner peripheral end (tips of the lever portions 4b) of the diaphragm spring 4 when it is shifted furthest into the release direction, more specifically, by a distance from the flywheel 51 or a distance from a particular portion of a clutch housing (not shown). Accordingly, when the diaphragm spring 4 is released, the release travel increases compared to the release travel before the friction member 53 is worn, and the annular elastic portion 4a of the diaphragm spring, which is in contact with the fulcrum ring 12, moves an extra amount. As shown in FIG. 10, however, the travel of the pressure plate 3 is maintained to be constant by the gap 42. Accordingly, a gap A is formed between the fulcrum ring 12 and the annular elastic portion 4a of the diaphragm spring 4, and then the torque of the first adjust spring 15 rotates the second screw member 14 to fulfill the gap. As a result, the operation of the first wear compensation mechanism 8 is finished.

ALTERNATE EMBODIMENTS

Alternate embodiments will now be explained. In view of the similarity between the first and second embodiments, the parts of the alternate embodiments that are identical to the parts of the first embodiment will be given the same reference numerals as the parts of the first embodiment. Moreover, the descriptions of the parts of the alternate embodiments that are identical to the parts of the first embodiment may be omitted for the sake of brevity.

Figure 11:
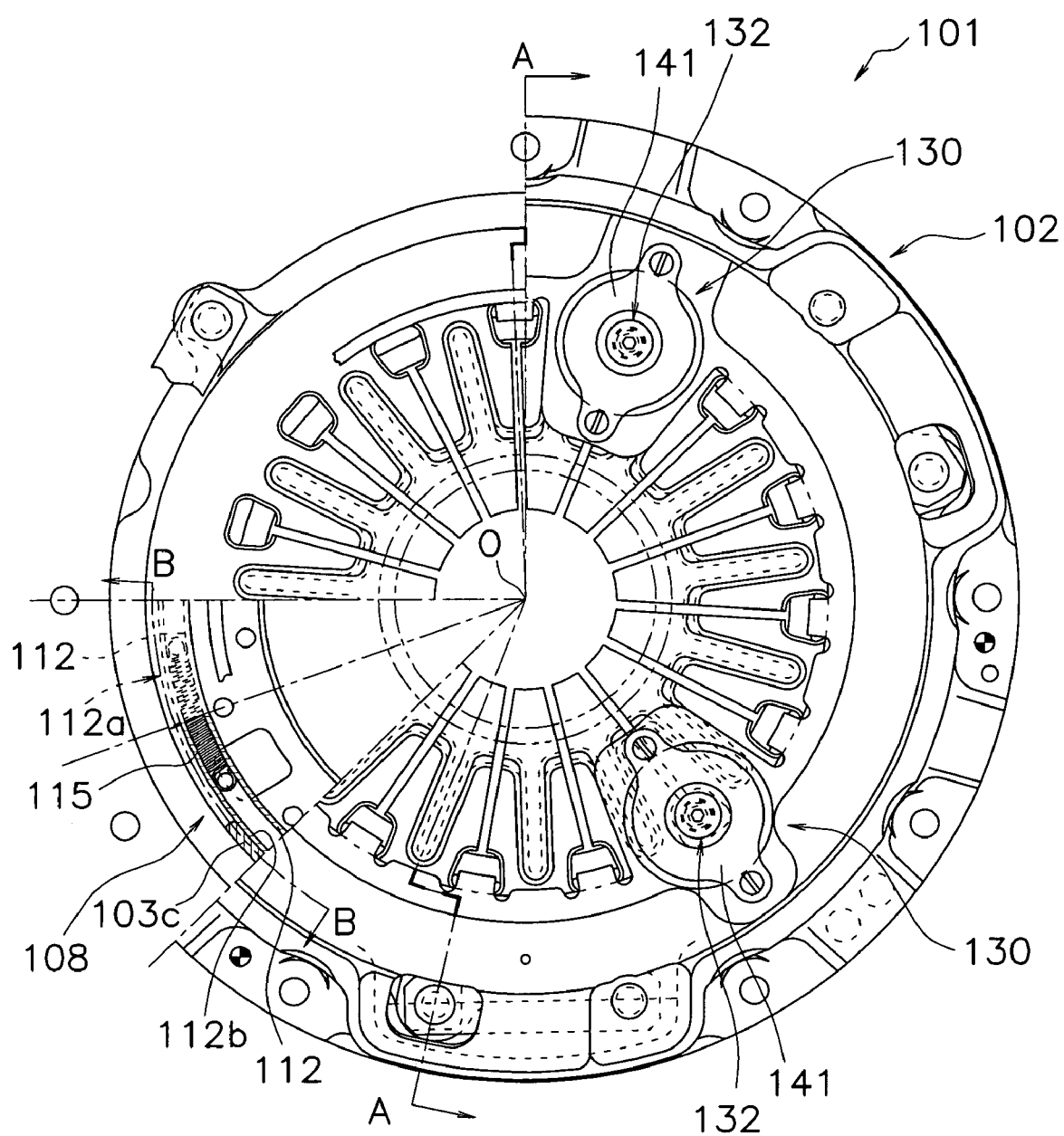
FIG. 11 is an elevated view of a clutch cover assembly according to a second embodiment of the present invention with parts removed for illustrative purposes.
Figure 12:
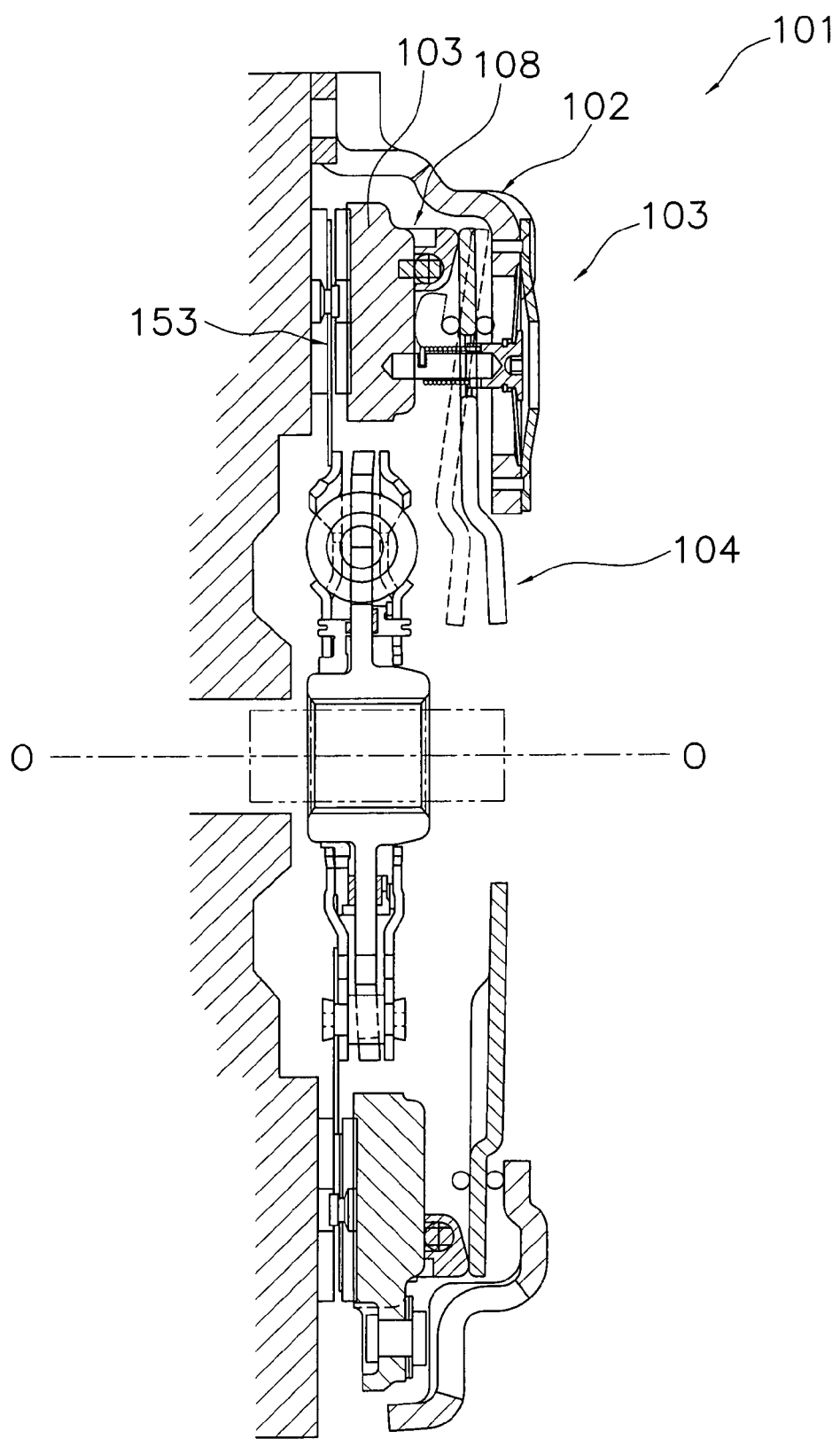
FIG. 12 is a cross-sectional view of the clutch cover assembly cut along a line A-A in FIG. 11.
Figure 13:
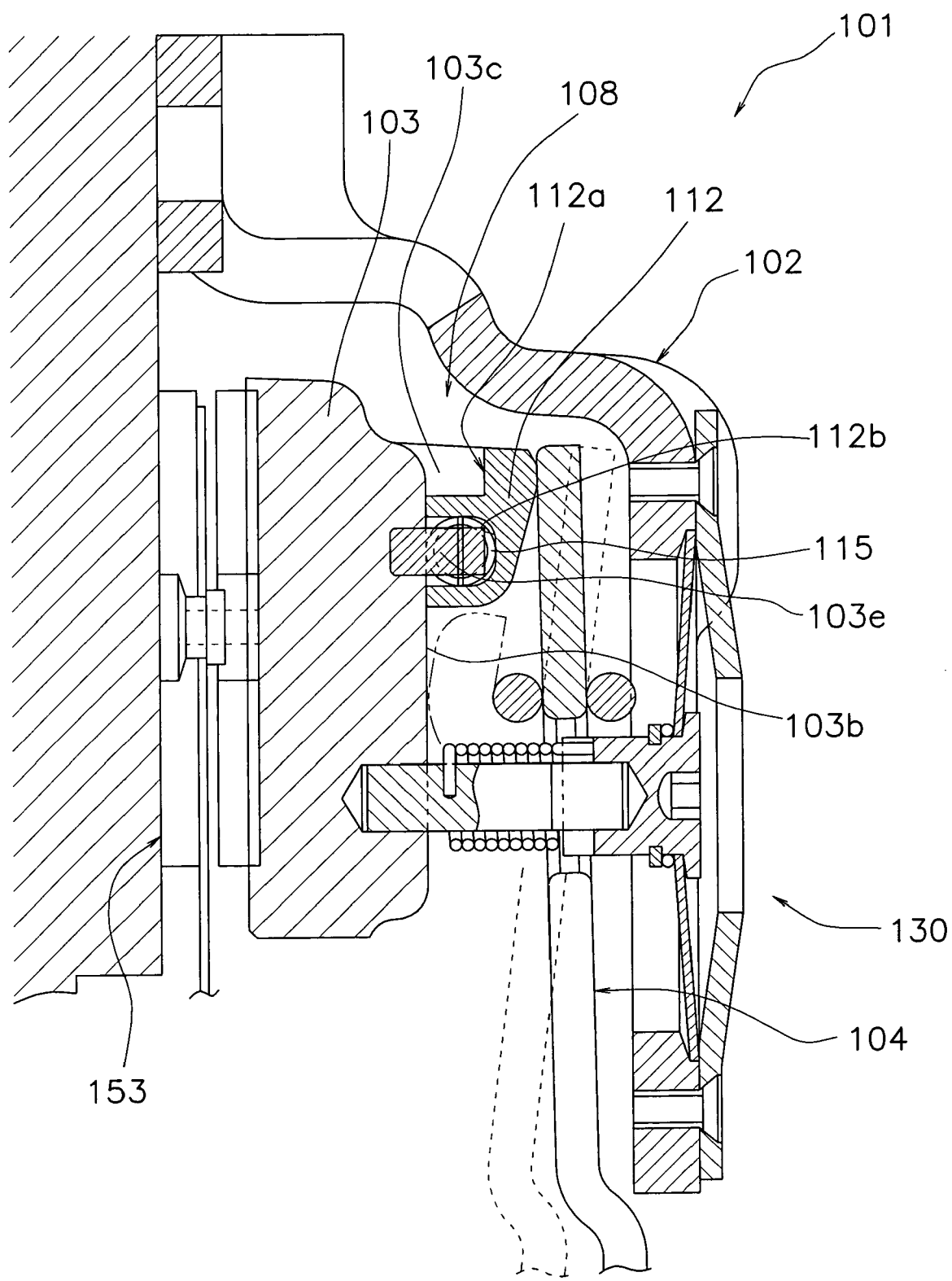
FIG. 13 is a longitudinal cross sectional diagram of a first wear compensation mechanism of the clutch cover assembly.
Figure 14:
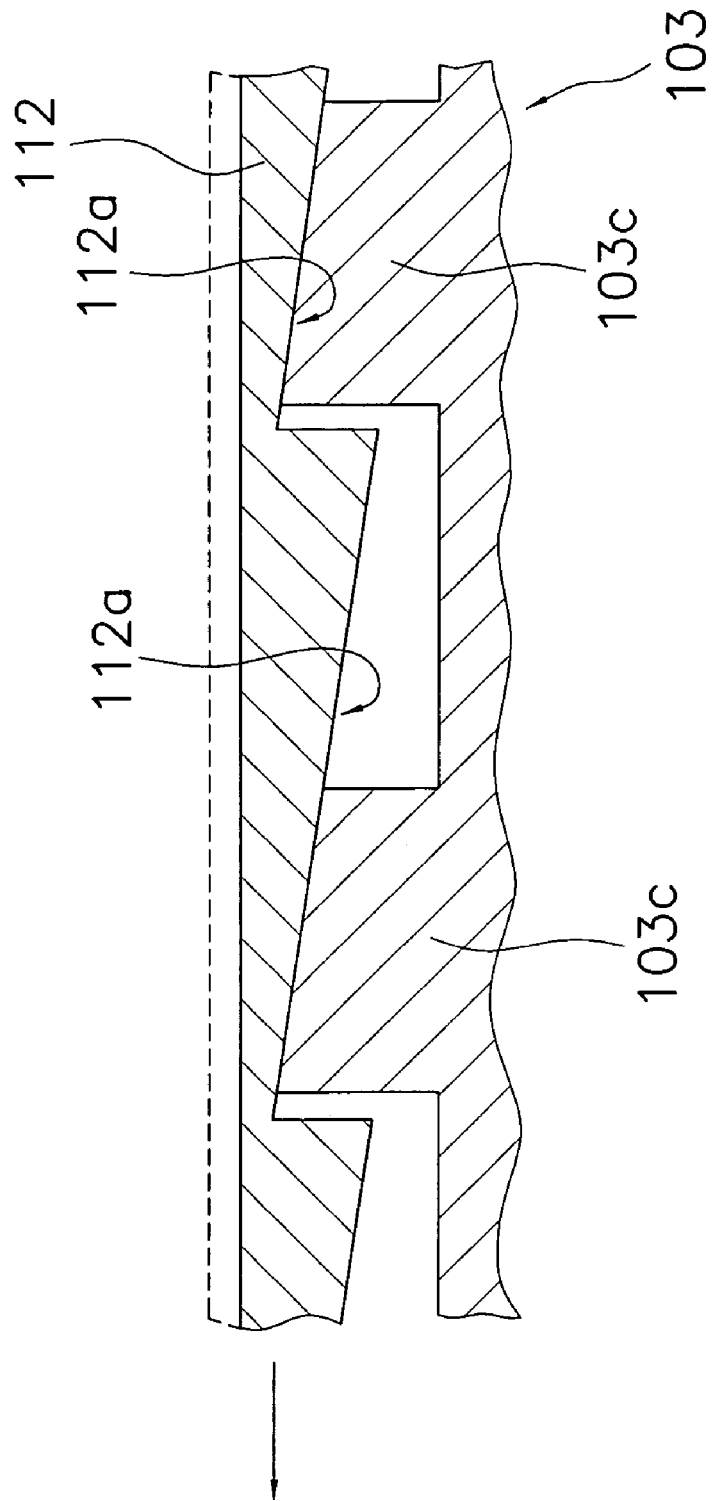
FIG. 14 is a cross-sectional fragmentary view of a pressure plate and fulcrum ring of the clutch cover assembly cut along a line B-B in FIG. 11.
Figure 15:
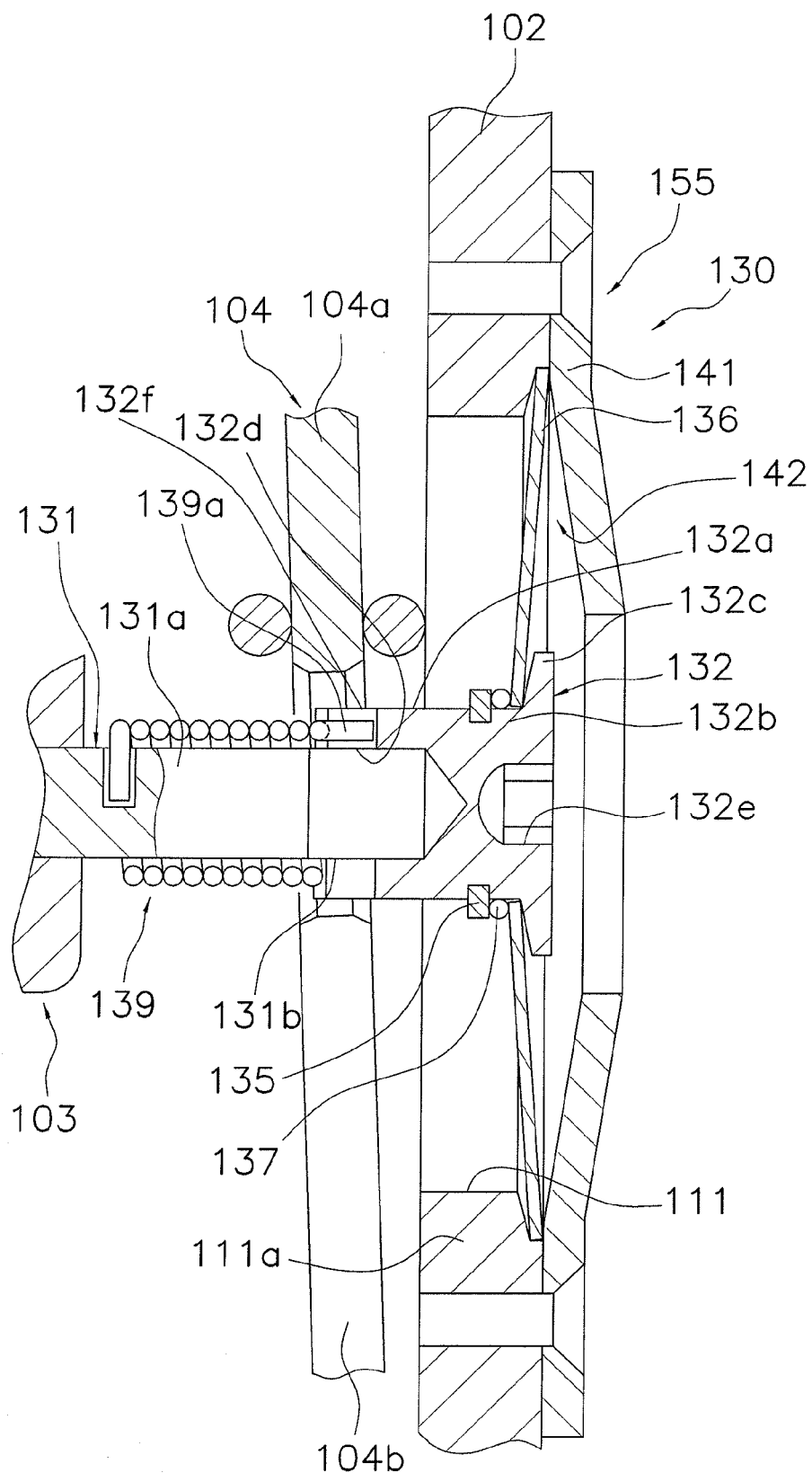
FIG. 15 is a longitudinal cross-sectional, diagrammatic view of a low release load characteristic achieving mechanism of the clutch cover assembly according to a second embodiment of the present invention.

(6) Other Embodiments of the First Wear Compensation Mechanism and the Low Release Load Characteristic Achieving Mechanism Referring to FIG. 11 through FIG. 15, a first wear compensation mechanism 108 and a mechanism 130 to achieve low release load characteristics in the accordance with a embodiment of the present invention will be described. FIG. 11 is an elevational view of a clutch cover assembly in accordance with the second embodiment of the present invention. FIG. 12 is a cross-sectional view of taken along A-A in FIG. 11. FIG. 13 is a cross-sectional diagrammatic view of the first wear compensation mechanism 108. FIG. 14 is a cross-sectional view taken along B-B in FIG. 12. FIG. 15 is a cross-sectional diagrammatic view of the low release load characteristic achieving mechanism 130 to realize low release load characteristics. It should be noted that FIGS. 11 through 15 show the clutch engagement states. The present embodiment employs a clutch cover assembly 101 of push-type, unlike the embodiment described above.

As shown in FIG. 11 through FIG. 15, the clutch cover assembly 101 in the present embodiment includes a first wear compensation mechanism 108 and a low release load characteristic achieving mechanism 130. The first wear compensation mechanism 108 and the low release load characteristic achieving mechanism 130 fulfill similar functions of the mechanisms 8 and 30 in the above-mentioned embodiment, respectively.

As shown in FIG. 13, the first wear compensation mechanism 108 is mainly composed of a fulcrum ring 112 and a plurality of springs 115. The fulcrum ring 112 is an annular ring member that is located on the axially transmission-side of a pressure plate 103, i.e. on a second axial surface 103b. The pressure plate 103 is urged by a diaphragm spring 104 having an annular elastic portion 104a and a plurality of lever portions 104b toward a friction member 153 via the fulcrum ring 112.

A plurality of support recesses 112a and an accommodating portion 112b are formed on a side of the fulcrum ring 112 near the pressure plate 103. The support recess 112a is a dent extending in an arc at a radially outer portion of the fulcrum ring 112 and formed continuously in the circumferential direction. A plurality of cylindrically shaped support protrusions 103c is formed on the pressure plate 103, the support protrusion 103c extending in the axial direction and being fitted into the support recess 112a.

Also, as shown in FIG. 14, faces of the support recess 112a and the support protrusion 103c contacting with each other in the axial direction have a tapered shape inclined in the circumferential direction. When the fulcrum ring 112 and the pressure plate 103 rotate relative to each other, the fulcrum ring 112 moves relative to the pressure plate 103 in the axial direction.

As seen in FIG. 13, the accommodating portion 112b is an annular dent formed on a side face of the fulcrum ring 112 near the pressure plate 103 to accommodate the springs 115 that are elastically deformable in the circumferential direction.

The springs 115 elastically connect the pressure plate 103 with the fulcrum ring 112 in the rotational direction. More specifically, one end of the spring 115 is hooked in a first fixation portion 103e protruding from the pressure plate 103. The other end of the spring 115 is hooked in a second fixing portion that is located in the accommodating portion 112b of the fulcrum ring 112 and extends in the axial direction. The spring 115 is set extended in the circumferential direction to pull the fulcrum ring 112 and the pressure plate 103 in the circumferential direction. When the fulcrum ring 112 rotates in the left direction in FIG. 14 relative to the pressure plate 103, for example, the fulcrum ring 112 moves relative to the pressure plate 103 upward in FIG. 14 (toward the transmission in the axial direction).

The wear compensation function of the first wear compensation mechanism 108 is fulfilled by the above-described structures.

As shown in FIG. 15, the low release load characteristic achieving mechanism 130 is composed of a support bolt 131 (support member), a holder 132 (support and engagement member), a snap ring 135, an intermediate ring 137, a cone spring 136 (first elastic member), and a second adjust spring 139 (second elastic member).

The support bolt 131 includes, like the above-mentioned embodiment, a base 131a and a screw portion 131b. The structure of each component is the same as those of the above-mentioned embodiment, so the detailed explanation will be omitted.

The holder 132 is composed of a holder main body 132a (support and engagement member main body), an engagement portion 132f, a head 132b, and an annular protrusion 132c. The holder main body 132a is a cylindrical portion extending in the axial direction, and has an inner circumference formed with a screw 132d to be threadedly engaged with the screw portion 131b. The holder main body 132a is threadedly engaged with the screw portion 131b of the support bolt 131. The engagement portion 132f is a portion extending in the axial direction from the axially engine-side end of the holder main body 132a, and is engaged with an engagement end 139a of the second adjust spring 139. The head 132b is a portion that covers the axially transmission-side end of the holder main body 132a and penetrates a hole 111 of a clutch cover 102 in the axial direction. The annular protrusion 132c is an annular portion formed around the head 132b. The head 132b is formed with a hex socket 132e in the center on an axially transmission-side face thereof.

The cone spring 136 is located around the head 132b. The cone spring 136 has an inner periphery in contact with the annular protrusion 132c from the axially engine-side, and an outer periphery in contact with an annular protrusion 111a formed around the hole 111 in the clutch cover 102 from the axially transmission-side. The snap ring 135 is fitted around the head 132b, and the intermediate ring 137 is sandwiched between the inner periphery of the cone spring 136 and the snap ring 135 in the axial direction.

Figure 16:
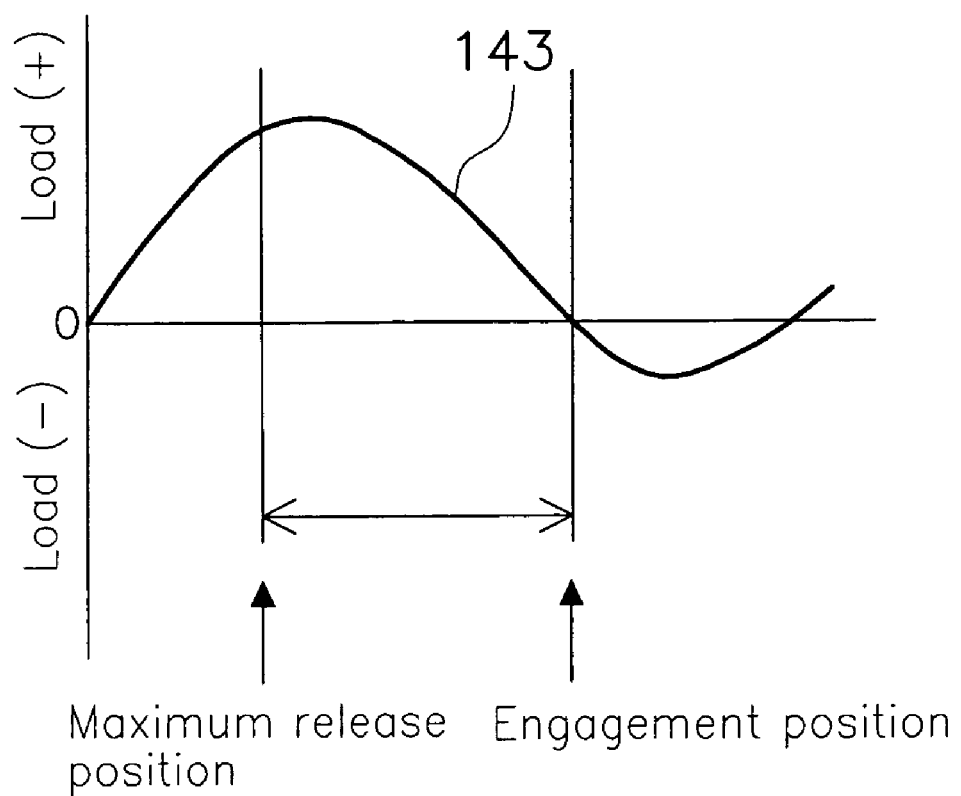
FIG. 16 is a diagrammatic view provided to explain load characteristic of the low release load characteristic achieving mechanism to achieve low release load characteristics.

Consequently, the cone spring 136 can apply a load to an assembly including the holder 132 and so on toward the transmission in the axial direction. Unlike the above-mentioned embodiment, however, the low release load characteristic achieving mechanism 130 does not include an elastic member equivalent with the second cone spring 37. Accordingly, the load characteristic 143 of the low release load characteristic achieving mechanism 130 that corresponds to the composite load characteristic (FIG. 7) in the first embodiment is shown in FIG. 16. In this case, as shown in FIG. 16, the load is set so that it will be zero when the clutch is engaged. Furthermore, as in the above-described embodiment, the low release load characteristic achieving mechanism 130 has a function of reducing the release load by applying a load to the holder 132 and so on toward the transmission in the axial direction during the clutch release operation.

Referring again to FIG. 15, the low release load characteristic achieving mechanism 130 includes, like the above-mentioned embodiment, a stopper mechanism 155. More specifically, a support ring 141 has a generally disc spring shape, and a gap 142 is provided between the support ring 141 and the cone spring 136 in the axial direction. In this case too, like the above-mentioned embodiment, the clutch release travel of the pressure plate can be restricted.

The low release load characteristic achieving mechanism 130 includes only one first cone spring 136, that is, the number of the cone spring is fewer than that in the above-described embodiment by three. As a result, the axial dimension of the low release load characteristic achieving mechanism 130 is further shortened, so that the low release load characteristic achieving mechanism 130 does not protrude outward from the clutch cover 102, thereby further shortening the axial dimension of the clutch cover assembly.

Since the number of the cone spring is fewer, it is possible to simplify the structure of the holder 132 and further reduce the number of components.

The detailed explanation of the low release load characteristic achieving mechanism 130 is omitted because it is the same or substantially the same as that in the first embodiment.

(7) Other Embodiments

The above-mentioned embodiments are just examples of the present invention, and they can be changed within the spirit and scope of the present invention. For example, although the first embodiment employs a pull-type clutch cover assembly and the second a push-type, the embodiments of the present invention can be respectively applied to push-type and pull-type clutch cover assemblies.

Although the low release load characteristic achieving mechanism 130 in the second embodiment is made of one cone spring, it may have of a plurality of cone springs like the first embodiment.

The term "configured" as used herein to describe a component, section or part of a device e that is constructed and/or programmed to carry out the desired function.

Moreover, terms that are expressed as "means-plus function" in the claims should include any structure that can be utilized to carry out the function of that part of the present invention.

Finally, terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A clutch cover assembly for pressing a friction member of a clutch disc assembly with a cushioning function against a flywheel of an engine and for releasing the pressing, comprising:
    a clutch cover being configured to be fixed to the flywheel;
    a pressure plate being non-rotatably fixed to said clutch cover to sandwich the friction member between the flywheel and itself;
    a diaphragm spring being supported by said clutch cover to urge said pressure plate toward the flywheel;
    a first wear compensation mechanism being configured to maintain a posture of said diaphragm spring in response to wear of the friction member; and
    a low release load mechanism having
        a first elastic member supported by said clutch cover to generate a load counteracting an urging force of said diaphragm spring during a release operation such that pressing load to said pressure plate is progressively decreased as displacement magnitude of said diaphragm spring is increased by the cushioning function of the friction member, and
        a second wear compensation mechanism being configured to maintain a posture of said first elastic member by returning said first elastic member to a posture before the wear in response to the wear of the friction member, said second wear compensation mechanism including
            a support member extending from said pressure plate toward said clutch cover,
            a support and engagement member being threadedly engaged with the outer circumference of said support member and being given a load in an axial direction away from the friction member from said first elastic member, and
            a second elastic member being configured to constantly apply torque to said support and engagement member so that said support and engagement member will rotate to move in an axial direction away from the friction member, said second elastic member being located on a side of said support and engagement member near the friction member in the axial direction.

2. The clutch cover assembly according to claim 1, wherein said second elastic member is located between said clutch cover and said pressure plate in the axial direction.

3. The clutch cover assembly according to claim 1, wherein said support and engagement member covers an end of said support member.

4. The clutch cover assembly according to claim 1, wherein said support and engagement member includes a support and engagement member main body having a cylindrical shape that is threadedly engaged with the outer circumference of said support member, an annular engagement portion that is formed at one end of said support and engagement member main body and receives torque from said second elastic member, and a head that covers the other end of said support and engagement member main body.

5. The clutch cover assembly according to claim 1, wherein said second wear compensation mechanism further includes a guide plate located between said support and engagement member and said second elastic member in the axial direction to restrict a radial position of one end of said second elastic member near said clutch cover in the axial direction.

6. The clutch cover assembly according to claim 1, further comprising
    a limit mechanism to limit a clutch release travel of said pressure plate, wherein
    said first wear compensation mechanism includes a fulcrum member that is located on said pressure plate to function as a fulcrum for said diaphragm spring, and an urging mechanism to urge said fulcrum member toward said diaphragm spring.

7. A clutch cover assembly for pressing a friction member of a clutch disc assembly with a cushioning function against a flywheel of an engine and for releasing the pressing, comprising:
    a clutch cover being configured to be fixed to the flywheel;
    a pressure plate being non-rotatably fixed to said clutch cover to sandwich the friction member between the flywheel and itself;
    a diaphragm spring being supported by said clutch cover to urge said pressure plate toward the flywheel;
    a first wear compensation mechanism being configured to maintain a posture of said diaphragm spring in response to wear of the friction member; and
    a low release load mechanism having
        a first elastic member being supported by said clutch cover to generate a load counteracting an urging force of said diaphragm spring during a release operation such that pressing load to said pressure plate is progressively decreased as displacement magnitude of said diaphragm spring is increased by the cushioning function of the friction member, and
        a second wear compensation mechanism being configured to maintain a posture of said first elastic member by returning said first elastic member to a posture before the wear in response to the wear of the friction member, said second wear compensation mechanism including
            a support member extending from said pressure plate toward said clutch cover,
            a support and engagement member being threadedly engaged with the outer circumference of said support member and being given a load in an axial direction away from the friction member from said first elastic member, and
            a second elastic member being configured to constantly apply torque to said support and engagement member so that said support and engagement member will rotate to move in an axial direction away from the friction member, said second elastic member being located between said clutch cover and said pressure plate in the axial direction.

8. The clutch cover assembly according to claim 7, wherein said support and engagement member covers an end of said support member.

9. The clutch cover assembly according to claim 7, wherein said support and engagement member includes a support and engagement member main body having a cylindrical shape that is threadedly engaged with the outer circumference of said support member, an annular engagement portion that is formed at one end of said support and engagement member main body and receives torque from said second elastic member, and a head that covers the other end of said support and engagement member main body.

10. The clutch cover assembly according to claim 7, wherein said second wear compensation mechanism further includes a guide plate located between said support and engagement member and said second elastic member in the axial direction to restrict a radial position of one end of said second elastic member near said clutch cover in the axial direction.

11. The clutch cover assembly for pressing a friction member of a clutch disc assembly with a cushioning function against a flywheel of an engine and for releasing the pressing, comprising:
a clutch cover being configured to be fixed to the flywheel;
a pressure plate being non-rotatably fixed to said clutch cover to sandwich the friction member between the flywheel and itself;
a diaphragm spring being supported by said clutch cover to urge said pressure plate toward the flywheel;
a first wear compensation mechanism being configured to maintain a posture of said diaphragm spring in response to wear of the friction member; and
a low release load mechanism having
a first elastic member supported by said clutch cover to generate a load counteracting an urging force of said diaphragm spring during a release operation such that pressing load to said pressure plate is progressively decreased as displacement magnitude of said diaphragm spring is increased by the cushioning function of the friction member,
a second wear compensation mechanism being configured to maintain a posture of said first elastic member by returning said first elastic member to a posture before the wear in response to the wear of the friction member, said second wear compensation mechanism including
a support member extending from said pressure plate toward said clutch cover, and
a support and engagement member being threadedly engaged with the outer circumference of said support member and being given a load in an axial direction away from the friction member from said first elastic member, and
a second elastic member being configured to constantly apply torque to said support and engagement member so that said support and engagement member will rotate to move in an axial direction away from the friction member, said support and engagement member covering an end of said support member.

12. The clutch cover assembly according to claim 11, wherein said support and engagement member includes a support and engagement member main body having a cylindrical shape that is threadedly engaged with the outer circumference of said support member, an annular engagement portion that is formed at one end of said support and engagement member main body and receives torque from said second elastic member, and a head that covers the other end of said support and engagement member main body.

13. The clutch cover assembly according to claim 12, wherein axial cross section of said head has a polygonal shape.

14. The clutch cover assembly according to claim 13, wherein said second wear compensation mechanism further includes a guide plate located between said support and engagement member and said second elastic member in the axial direction to restrict a radial position of one end of said second elastic member near said clutch cover in the axial direction.

15. The clutch cover assembly according to claim 14, further comprising
a limit mechanism to limit a clutch release travel of said pressure plate, wherein
said first wear compensation mechanism includes a fulcrum member that is located on said pressure plate to function as a fulcrum for said diaphragm spring, and an urging mechanism to urge said fulcrum member toward said diaphragm spring.

16. The clutch cover assembly according to claim 15, wherein said limit mechanism is located in said low release load mechanism.

17. The clutch cover assembly according to claim 16, wherein said limit mechanism includes a limit member that is fixed to said clutch cover to limit the movement of said pressure plate in an axial direction opposite the friction member.

18. The clutch cover assembly according to claim 17, wherein said limit member is located on a side of at least one of said support and engagement member and said first elastic member opposite the friction member in the axial direction for an axial contact therewith.

19. The clutch cover assembly according to claim 17, wherein said limit member is located on a side of said pressure plate opposite the friction member in the axial direction for an axial contact therewith.

20. The clutch cover assembly according to claim 11, wherein said second wear compensation mechanism further includes a guide plate located between said support and engagement member and said second elastic member in the axial direction to restrict a radial position of one end of said second elastic member near said clutch cover in the axial direction.

\* \* \* \* \*